United States Patent
Wang et al.

(10) Patent No.: US 10,444,912 B2
(45) Date of Patent: Oct. 15, 2019

(54) SENSING METHOD OF SENSING DEVICE AND STRETCHABLE SENSOR DEVICE

(71) Applicant: Industrial Technology Research Institute, Hsinchu (TW)

(72) Inventors: Sheng-Po Wang, Taoyuan (TW); Chih-Chia Chang, Hsinchu County (TW); Chao-Jen Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 75 days.

(21) Appl. No.: 15/394,840

(22) Filed: Dec. 30, 2016

(65) Prior Publication Data

US 2018/0188843 A1 Jul. 5, 2018

(51) Int. Cl.
| G06F 3/044 | (2006.01) |
| G06F 3/041 | (2006.01) |
| G06F 3/045 | (2006.01) |
| G06F 3/0338 | (2013.01) |

(52) U.S. Cl.
CPC ............ G06F 3/044 (2013.01); G06F 3/0338 (2013.01); G06F 3/045 (2013.01); G06F 3/0414 (2013.01); *G06F 2203/04102* (2013.01)

(58) Field of Classification Search
None
See application file for complete search history.

(56) References Cited

U.S. PATENT DOCUMENTS

| 6,033,370 A | 3/2000 | Reinbold et al. |
| 7,629,691 B2 | 12/2009 | Roush et al. |
| 8,097,926 B2 | 1/2012 | De Graff et al. |

(Continued)

FOREIGN PATENT DOCUMENTS

| CN | 1692371 | 11/2005 |
| CN | 101320309 | 12/2008 |

(Continued)

OTHER PUBLICATIONS

"Office Action of Taiwan Counterpart Application," dated Apr. 21, 2017, p. 1-p. 5.

(Continued)

*Primary Examiner* — Chad M Dicke
(74) *Attorney, Agent, or Firm* — JCIPRNET

(57) ABSTRACT

A stretchable sensing device includes at least one first unit structure, at least one second unit structure and a stretchable material layer. The first unit structure includes a first substrate and a first sensing element layer, wherein the first substrate includes multiple first slits and multiple first distribution regions defined by the first slits. The first sensing element layer includes multiple first sensing electrodes being electrically isolated to each other and located on the first substrate. The second unit structure is located on the first unit structure and includes a second substrate and a second sensing element layer located on the second substrate. The stretchable material layer is located between the first unit structure and the second unit structure, and provides a changeable spacing between at least two of the first sensing electrodes located on adjacent first distribution regions. A sensing method of the stretchable sensing device is also provided.

19 Claims, 13 Drawing Sheets

(56) References Cited

U.S. PATENT DOCUMENTS

| | | | |
|---|---|---|---|
| 8,132,468 B2* | 3/2012 | Radivojevic | G01L 1/16 |
| | | | 73/777 |
| 8,492,876 B2 | 7/2013 | Wong et al. | |
| 8,547,197 B2* | 10/2013 | Byun | H01C 10/10 |
| | | | 338/2 |
| 8,603,574 B2* | 12/2013 | Huang | H05K 1/028 |
| | | | 349/159 |
| 8,633,916 B2 | 1/2014 | Bernstein et al. | |
| 8,742,260 B2* | 6/2014 | Sato | H01R 13/2414 |
| | | | 174/254 |
| 8,802,996 B2* | 8/2014 | Hayashi | H05K 3/4673 |
| | | | 174/255 |
| 8,883,287 B2 | 11/2014 | Boyce et al. | |
| 9,007,315 B2* | 4/2015 | Kim | G06F 3/0414 |
| | | | 345/173 |
| 9,391,208 B2* | 7/2016 | Yan | H01L 29/78606 |
| 9,599,820 B2* | 3/2017 | Lee | G02B 27/017 |
| 9,601,557 B2* | 3/2017 | Yang | H01L 27/1218 |
| 10,019,052 B2* | 7/2018 | Lee | G06F 3/01 |
| 10,048,821 B2* | 8/2018 | Kang | G06F 3/044 |
| 2004/0168824 A1* | 9/2004 | Sekido | H05K 1/0271 |
| | | | 174/256 |
| 2005/0280157 A1 | 12/2005 | Roush et al. | |
| 2008/0157235 A1 | 7/2008 | Rogers et al. | |
| 2009/0184954 A1 | 7/2009 | Street | |
| 2010/0096729 A1 | 4/2010 | Wong et al. | |
| 2010/0238636 A1 | 9/2010 | Mascaro et al. | |
| 2010/0298895 A1 | 11/2010 | Ghaffari et al. | |
| 2010/0301879 A1 | 12/2010 | Philipp | |
| 2011/0018556 A1 | 1/2011 | Le et al. | |
| 2011/0031041 A1 | 2/2011 | Bulea et al. | |
| 2011/0139517 A1 | 6/2011 | Mizushima | |
| 2011/0248954 A1 | 10/2011 | Hamada et al. | |
| 2012/0038613 A1* | 2/2012 | Choi | G06F 1/1652 |
| | | | 345/211 |
| 2013/0009653 A1* | 1/2013 | Fukushima | G06F 3/044 |
| | | | 324/679 |
| 2013/0041235 A1 | 2/2013 | Rogers et al. | |
| 2013/0141382 A1* | 6/2013 | Simmons | G06F 3/0418 |
| | | | 345/174 |
| 2013/0234977 A1 | 9/2013 | Lin et al. | |
| 2013/0265257 A1* | 10/2013 | Jung | G06F 3/0412 |
| | | | 345/173 |
| 2013/0265262 A1* | 10/2013 | Jung | G06F 3/041 |
| | | | 345/173 |
| 2013/0281814 A1 | 10/2013 | Tilt et al. | |
| 2013/0319135 A1 | 12/2013 | Okada et al. | |
| 2014/0049463 A1* | 2/2014 | Seo | G06F 3/0487 |
| | | | 345/156 |
| 2014/0132553 A1* | 5/2014 | Park | G06F 3/044 |
| | | | 345/174 |
| 2014/0296687 A1 | 10/2014 | Irazoqui et al. | |
| 2015/0034935 A1 | 2/2015 | Choi | |
| 2015/0084909 A1* | 3/2015 | Worfolk | G06F 3/0414 |
| | | | 345/174 |
| 2015/0220118 A1* | 8/2015 | Kwak | G06F 3/14 |
| | | | 345/667 |
| 2015/0227173 A1* | 8/2015 | Hwang | G06F 1/1652 |
| | | | 345/619 |
| 2016/0037623 A1* | 2/2016 | Fjelstad | H05K 1/0203 |
| | | | 361/720 |
| 2016/0054813 A1* | 2/2016 | Schediwy | G06F 3/0338 |
| | | | 345/161 |
| 2016/0077648 A1* | 3/2016 | Hsieh | G06F 3/0414 |
| | | | 345/174 |
| 2016/0098132 A1* | 4/2016 | Kim | G06F 3/0416 |
| | | | 345/173 |
| 2016/0103534 A1* | 4/2016 | Zhang | G06F 1/169 |
| | | | 345/173 |
| 2016/0218305 A1* | 7/2016 | Kim | G02F 1/133305 |
| 2016/0246432 A1* | 8/2016 | Hong | G06F 3/0412 |
| 2016/0265897 A1* | 9/2016 | Ray | G01L 1/205 |
| 2016/0357289 A1* | 12/2016 | Jeong | G06F 1/1652 |
| 2017/0031484 A1* | 2/2017 | Kim | G06F 3/044 |
| 2017/0097721 A1* | 4/2017 | Wang | G06F 1/1652 |
| 2017/0102738 A1* | 4/2017 | Park | G06F 1/1652 |
| 2017/0168643 A1* | 6/2017 | Wang | G06F 3/0412 |
| 2017/0277341 A1* | 9/2017 | Lim | G06F 3/0416 |
| 2017/0350686 A1* | 12/2017 | Otaka | G01B 7/16 |
| 2018/0004292 A1* | 1/2018 | Kuo | G06F 3/016 |
| 2018/0107325 A1* | 4/2018 | Hong | G06F 3/044 |
| 2018/0114491 A1* | 4/2018 | Tokuda | G09G 3/3233 |
| 2018/0249576 A1* | 8/2018 | Ogura | H01B 5/14 |
| 2018/0260072 A1* | 9/2018 | Franklin | G06F 1/1626 |

FOREIGN PATENT DOCUMENTS

| | | |
|---|---|---|
| CN | 101989019 | 3/2011 |
| CN | 102036600 | 4/2011 |
| CN | 102918370 | 2/2013 |
| CN | 104952832 | 9/2015 |
| CN | 204885164 | 12/2015 |
| EP | 0841649 | 5/1998 |
| TW | 200933558 | 8/2009 |
| TW | M505308 | 7/2015 |
| TW | 201531899 | 8/2015 |
| WO | 2014058473 | 4/2014 |

OTHER PUBLICATIONS

"Office Action of Taiwan Related Application, Application No. 105139083", dated Apr. 10, 2018, p. 1-p. 10.

"Office Action of Taiwan Related Application, application No. 105114513", dated Dec. 26, 2017, p. 1-p. 4.

Cho et al., "Engineering the shape and structure of materials by fractal cut," Proceedings of the National Academy of Sciences, Dec. 9, 2014, pp. 17390-17395.

Chao-Jen Wang et al., "Structure Constructed by Sheet," Unpublished U.S. Appl. No. 15/229,095, filed Aug. 4, 2016.

Sheng-Po Wang et al., "Flexible Electronic Device," Unpublished U.S. Appl. No. 15/394,827, filed Dec. 30, 2016.

"Office Action of China Related Application No. 201611229345.X", dated Jul. 1, 2019, pp. 1-7.

* cited by examiner

SENSING METHOD OF SENSING DEVICE AND STRETCHABLE SENSOR DEVICE

BACKGROUND

Technical Field

The present disclosure relates to a sensing device, and particularly, to a stretchable sensing device.

Background

With the rapid development of electronic technology, new electronic products continue to be introduced. For the electronic products to be applied to different areas, characteristics of flexible, light and thin, and unrestricted appearance have attracted more attention gradually. Namely, the appearances of the electronic products are gradually required to be various based on different purposes and environments of application. In terms of three-dimensional shaped electronic products, it is difficult to manufacture wirings on a curved surface. In addition, the design of the three-dimensional shape may not be a perfect circular or perfect spherical article, and a bent degree or a curvature of the surface thereof must be changed according to the design needs.

SUMMARY

An embodiment of the present disclosure provides a stretchable sensing device, which may be stretched and expanded into a non-planar structure based on the needs.

The stretchable sensing device of an embodiment of the present disclosure includes at least one first unit structure, at least one second unit structure and a stretchable material layer. The first unit structure includes a first substrate and a first sensing element layer, wherein the first substrate has a plurality of first slits and a plurality of first distribution regions defined by the first slits. The first sensing element layer includes a plurality of first sensing electrodes which are electrically isolated to each other and located on the first distribution regions. The second unit structure is located on the first unit structure, and includes a second substrate and a second sensing element layer located on the second substrate. The stretchable material layer is located between the first unit structure and the second unit structure to provide a changeable spacing between at least two of the first sensing electrodes located on adjacent first distribution regions.

In the stretchable sensing device of an embodiment of the present disclosure, the stretchable material layer is distributed between the adjacent first distribution regions so that a spacing between the first distribution regions may be changed, and the stretchable sensing device may have an effect of stretching in conform with use requirements, thereby increasing an applicability of the stretchable sensing device. In a sensing method of the stretchable sensing device of an embodiment of the present disclosure, the stretchable material layer connecting the first distribution regions is formed, thereby capable of sensing a deformation state of the stretchable sensing device.

Several exemplary embodiments accompanied with figures are described in detail below for easy to understand the invention.

DETAILED DESCRIPTION OF DISCLOSED EMBODIMENTS

Figure 1A:
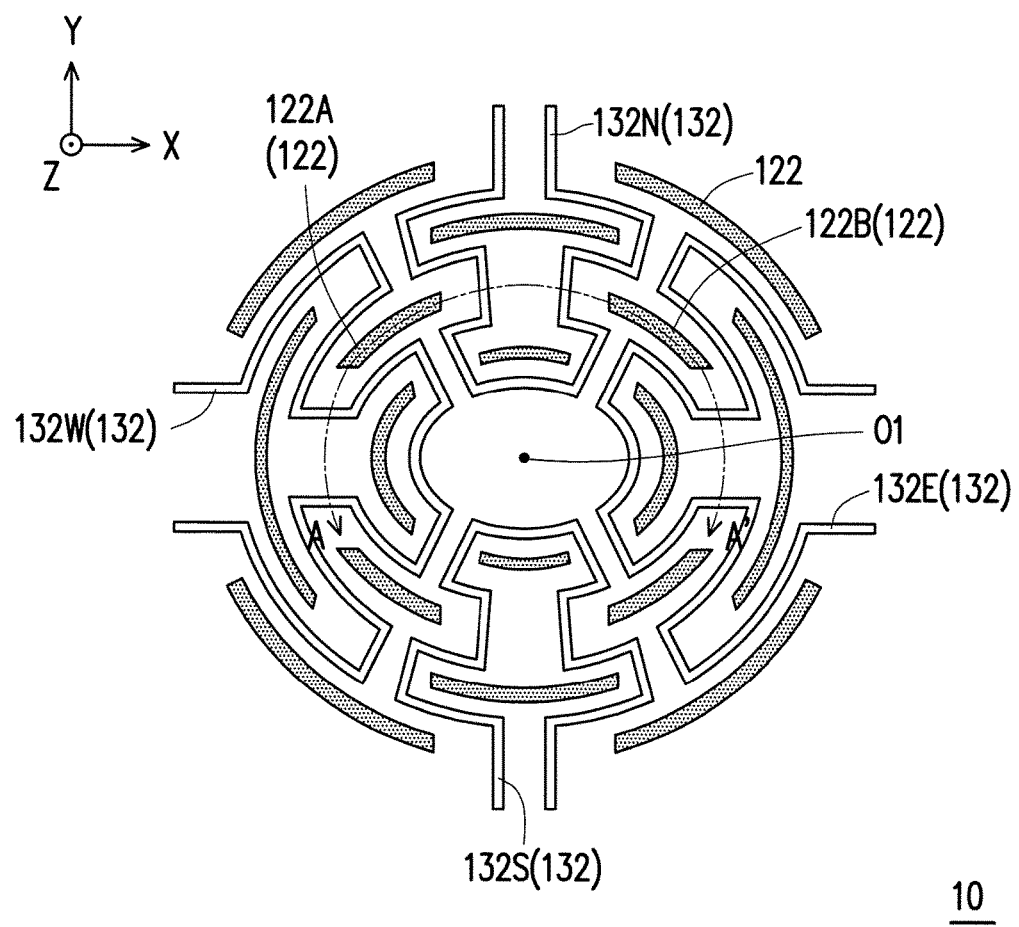
FIG. 1A is a schematic top view illustrating a stretchable sensing device according to an embodiment of the present disclosure.
Figure 1B:
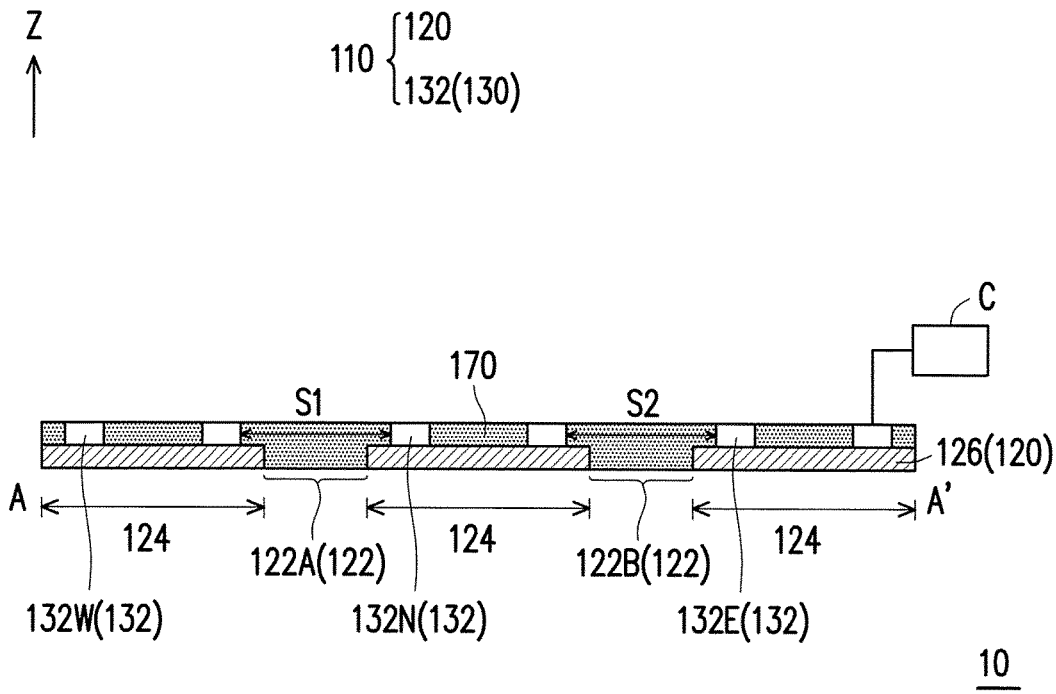
FIG. 1B is a schematic cross-sectional view illustrated along a section line A-A' in FIG. 1A.

FIG. 1A is a schematic top view illustrating a stretchable sensing device according to an embodiment of the present disclosure, wherein some layers are omitted in FIG. 1A. FIG. 1B is a schematic cross-sectional view illustrated along a section line A-A' in FIG. 1A, wherein in FIG. 1A, the Z-direction is perpendicular to the X-direction and the Y-direction, and is a direction pointing out of a plane in which FIG. 1A is drawn. Referring to FIG. 1A and FIG. 1B, a stretchable sensing device 10 of the present embodiment includes at least one first unit structure 110 and a stretchable material layer 170. The first unit structure 110 includes a first substrate 120 and a first sensing element layer 130. The first substrate 120 has a plurality of first slits 122 and a plurality of first distribution regions 124 defined by the first slits 122. The first sensing element layer 130 includes a plurality of first sensing electrodes 132 which are electrically isolated to each other, wherein the first sensing electrodes 132 are located on the first distribution regions 124. The stretchable material layer 170 is at least disposed in the first slits 122 to provide a changeable spacing between two of the first sensing electrodes 132 located on adjacent first distribution regions 124. In FIG. 1A, only one first unit structure 110 is schematically illustrate, but the present disclosure is not limited thereto. In other embodiments, the stretchable sensing device 10 may include a plurality of first unit structures 110, and the first unit structures 110 may be arranged in an array-like manner to form a sensor array.

In detail, in the present embodiment, the first slits 122 of the first substrate 120 are, for example, arc-shaped, and the first slits 122 are distributed along ring-like paths that are arranged sequentially from the inside towards the outside around a first unit center O1, but the present disclosure is not limited thereto. In other embodiments, the first slits 122 may have appearances of being straight lines, polylines or curves, so that the first substrate 120 of the stretchable sensing device 10 may be stretched, compressed or bent with deformations of the corresponding first slits 122.

In the present embodiment, the first substrate 120 is, for example, a flexible substrate. Therefore, the first substrate 120 has a property of being flexible or bendable, and a material thereof includes, for example, polyimide (PI), polycarbonate (PC), polyamide (PA), polyethylene terephthalate (PET), polyethylene naphthalate (PEN), polyethylenimine (PEI), polyurethane (PU), polydimethylsiloxane (PDMS), acrylate such as polymethylmethacrylate (PMMA) or so forth, ether such as polyethersulfone (PES), polyetheretherketone (PEEK) or so forth, polyolefin, or other flexible material, but the present disclosure is not limited thereto. The first slits 122 located on the first substrate 120 are, for example, formed on the first substrate 120 by means of etching, cutting or computer numerical control (CNC) pressing, but the present disclosure is not limited thereto.

In the present embodiment, the stretchable material layer 170 may be formed in the first slits 122 between two adjacent first distribution regions 124 of the first substrate 120. As a result, the first slits 122 of the first substrate 120 may be non-hollow, and the stretchable property of the stretchable material layer 170 enables a horizontal spacing of two first sensing electrodes 132 located between the adjacent first distribution regions 124 to be changeable. The stretchable material layer 170 has a property of being extendable or compressible, and a material thereof includes, for example, polyimide (PI), saturated or unsaturated rubber, silicone, or other resilient material. Specifically, the stretchable material layer 170 may be correspondingly extended or compressed when the stretchable sensing device 10 is subjected to an external force, so as to enable the stretchable sensing device 10 to present a corresponding deformation state. Moreover, the stretchable material layer 170 serves an assist in dispersing the stress due to extension or compression so that the first substrate 120 or the structures thereon are not easy to be damaged. After the external force disappears, the stretchable sensing device 10 may be reverted to an initial state since it does not subject to the external force. In the present embodiment, a forming method of the stretchable material layer 170 is, for example, a coating method, a bonding method, a sol-gel method, or a press-fitting method. For example, after the stretchable material is formed in the first slits 122 or on the first unit structure 110, a photopolymerization or baking process may be performed based on the characteristics of the stretchable material, so as to cure the stretchable material into the stretchable material layer 170. In the present embodiment, a ratio of a Young's modulus of the first substrate 120 to a Young's modulus of the stretchable material layer 170 is greater than or equal to 10. In one embodiment, the ratio of the Young's modulus of the first substrate 120 to the Young's modulus of the stretchable material layer 170 is greater than or equal to 50. Alternatively, in one embodiment, the ratio of the Young's modulus of the first substrate 120 to the Young's modulus of the stretchable material layer 170 is greater than or equal to 100. That is, as compared to the first substrate 120, the stretchable material layer 170, after being subjected to the force, has a larger degree of plastic deformation.

In the present embodiment, the first sensing electrodes 132 are distributed on the first distribution regions 124 of the first substrate 120, such as being meanderingly distributed in conformity with a part of the first slits 122. In FIG. 1A, only four first sensing electrodes 132E, 132W, 132S, and 132N are schematically illustrated, and the four first sensing electrodes 132E, 132W, 132S, and 132N are electrically independent of each other. However, in other embodiments, the number of the first sensing electrodes 132 disposed on the first substrate 120 may be adjusted depending on different design requirements. In the present embodiment, the two first sensing electrodes 132N and 132S located in the Y-direction may be symmetrical to each other, and the two first sensing electrodes 132E and 132W located in the X-direction may be symmetrical to each other, but not limited thereto.

Figure 1C:
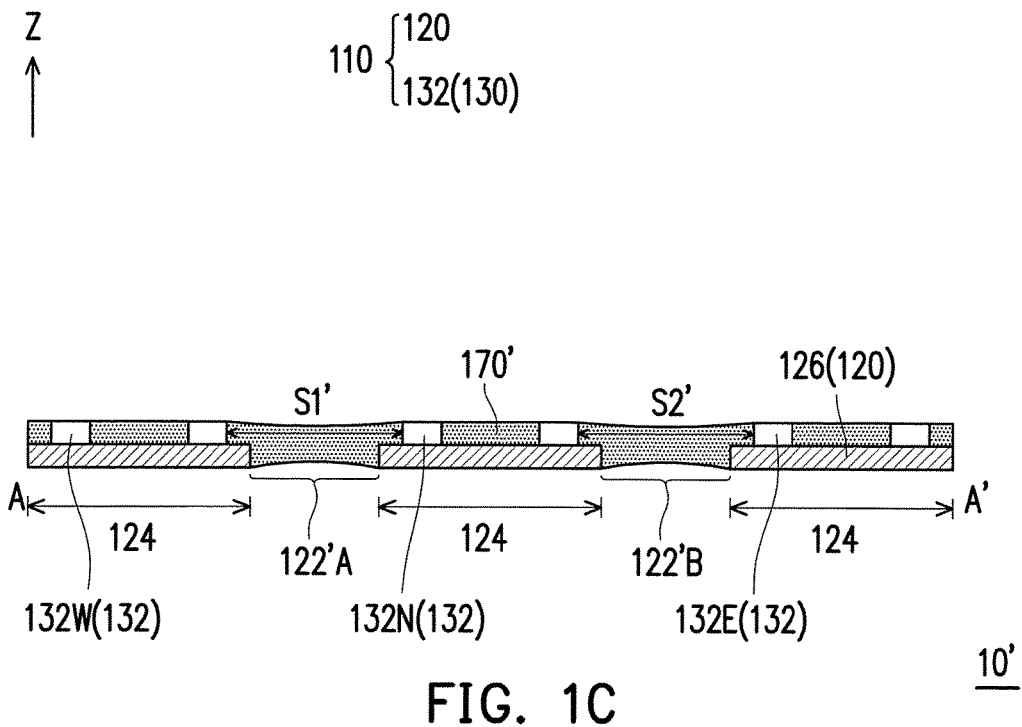
FIG. 1C is a schematic cross-sectional view illustrating a corresponding deformation state of the stretchable sensing device when subjected to an external force according to an embodiment of the present disclosure.

Referring to FIG. 1A through FIG. 1C, FIG. 1C is a schematic cross-sectional view illustrating a corresponding deformation state of the stretchable sensing device when subjected to an external force according to an embodiment of the present disclosure. Specifically, a stretchable sensing device 10' of FIG. 1C is a corresponding deformation state having by the stretchable sensing device 10 of FIG. 1B when being subjected to an effect of the external force. In the stretchable sensing device 10 of FIG. 1A and FIG. 1B, the first slit 122 between the first sensing electrode 132W and the first sensing electrode 132N is, for example, marked as 122A herein, and the first slit 122 between the first sensing electrode 132E and the first sensing electrode 132N is, for example, marked as 122B herein. In FIG. 1C, because the stretchable sensing device 10' is subjected to the effect of the external force, the stretchable material layer 170' in the first slits 122'A and 122'B may be correspondingly extended or shrunk so as to enable the stretchable sensing device 10' to have a corresponding deformation state.

Specifically, in the stretchable sensing device 10 of FIG. 1A and FIG. 1B, the first sensing electrode 132W and first sensing electrode 132N have a first horizontal spacing S1 therebetween, and the first sensing electrode 132E and the first sensing electrode 132N have a second horizontal spacing S2 therebetween. In the stretchable sensing device 10' of FIG. 1C, the first sensing electrode 132W and the first sensing electrode 132N has a first horizontal spacing S1' therebetween, and the first sensing electrode 132E and the first sensing electrode 132N has a second horizontal spacing S2' therebetween. In the present embodiment, a first variance ΔS1 from the first horizontal spacing S1 to the first horizontal spacing S1' may cause an electrical signal variation between the first sensing electrode 132W and the first sensing electrode 132N; similarly, a second variance ΔS2 from the second horizontal spacing S2 to the second horizontal spacing S2' may cause an electrical signal variation between the first sensing electrode 132E and the first sensing electrodes 132N. By measuring the signal variations between the first sensing electrodes 132E, 132W, 132S, and 132N, the deformation state of changing from the stretchable sensing device 10 to the stretchable sensing device 10' may be determined.

For example, when the first variance ΔS1 determined by the signal variance between the first sensing electrode 132W and the first sensing electrode 132N is greater than the second variance ΔS2 determined by the signal variance between the first sensing electrode 132E and the first sensing electrode 132N, it may determined that a region between the first sensing electrode 132W and the first sensing electrode 132N has a greater deformation, and that a region between the first sensing electrode 132E and the first sensing electrode 132N has a less deformation. Take the capacitance value to be an electrical signal for example, because a capacitance value between two conductors reduces as a distance therebetween increases, when the first variance ΔS1 is positive, it may be determined, by a controller C of the stretchable sensing device 10, to be a tensile deformation of increasing a distance between the first sensing electrode 132W and the first sensing electrode 132N; and when the first variance ΔS1 is negative, it may be determined by the controller C of the stretchable sensing device 10 to be a compression deformation of decreasing the distance between the first sensing electrode 132W and the first sensing electrode 132N. As a result, the deformation state of the entire stretchable sensing device 10 may be obtained after combining the measured variances with the corresponding position information.

Moreover, the first variance ΔS and the second variance ΔS2 may be produced under a variety of use methods. For example, the stretchable sensing device 10 may serve as a device for touch sensing. At this moment, a touch pressing action of a user may cause the first slit 122 at a position being touched to be deformed, but the first slits 122 at the region not being touched may not be deformed. The stretchable sensing device 10 may determine the touch position by a position corresponded to an occurrence of change in the first signal value of the first sensing electrodes 132. In another embodiment, the stretchable sensing device 10 may conformably cover a surface of a predetermined three-dimensional object. At this moment, a part of the first slits 122 on the stretchable sensing device 10, and even all the first slits 122, may be deformed. Therefore, the stretchable sensing device 10 may determine the deformations states of the stretchable sensing device 10 at individual regions with the variances of the first signal values measured from the first sensing electrodes 132.

In order to achieve a sensing function, the stretchable sensing device 10 may be communicatively connected to a sensing circuit so as to execute a mutual-capacitance sensing mode, a self-capacitance sensing mode, a resistance sensing mode or at least one of the aforesaid sensing modes. Under the mutual-capacitance sensing mode, the sensing circuit may include a scan driver and a sensing driver. The scan driver may scan driving electrodes of the first sensing element layer 130, and the sensing driver may perform a sensing signal reading to the corresponding sensing electrodes in the first sensing element layer 130 so as to obtain the corresponding first signal value. For example, the scan driver may scan one of the two adjacent first sensing electrodes 132, and then the sensing driver may perform a sensing signal reading to the other one of the first sensing electrodes 132 so as to execute an inductive capacitance sensing and obtain a first signal value. Moreover, the aforementioned mutual-capacitance sensing may be repeatedly executed so as to determine a deformation state corresponded to the stretchable sensing device 10 through the variances of the first signal values obtained during multiple measurements.

In another embodiment, the first sensing electrodes 132 may each be electrically connected to a corresponding scan driver (not shown) and a corresponding sensing driver (not shown) to execute the self-capacitance sensing mode to measure a corresponding first signal value. Moreover, the aforementioned self-capacitance sensing may be repeatedly executed so as to determine a deformation state corresponded to the stretchable sensing device 10 through the variances of the first signal values obtained during multiple measurements.

In other possible embodiments, the sensing circuit may include a resistance sensor (not shown), and the first sensing electrodes 132 may respectively be connected to the corresponding resistance sensor. When the stretchable sensing device 10 is subjected to the external force, the first sensing electrodes 132 may have a corresponding resistance variation by being stretched or shrunk. When the stretchable sensing device 10 is under the resistance sensing mode, the resistance sensors may respectively perform a resistance sensing to a plurality of first sensing electrodes 132 so as to obtain a corresponding first signal value. Moreover, the aforementioned resistance sensing may be repeatedly executed so as to determine a deformation state corresponded to the stretchable sensing device 10 through the variances of the first signal values obtained during multiple measurements.

In addition, when the stretchable sensing device 10 includes a plurality of first unit structures 110, and when the first unit structures 110 appear to be arranged in an array, each of the first unit structures 110 may serve as an independent sensing unit for sensing a deformation state at the position where it is disposed. At this moment, each of the first unit structures 110 may adopt at least one of the aforementioned sensing modes to perform sensing.

Figure 1D:
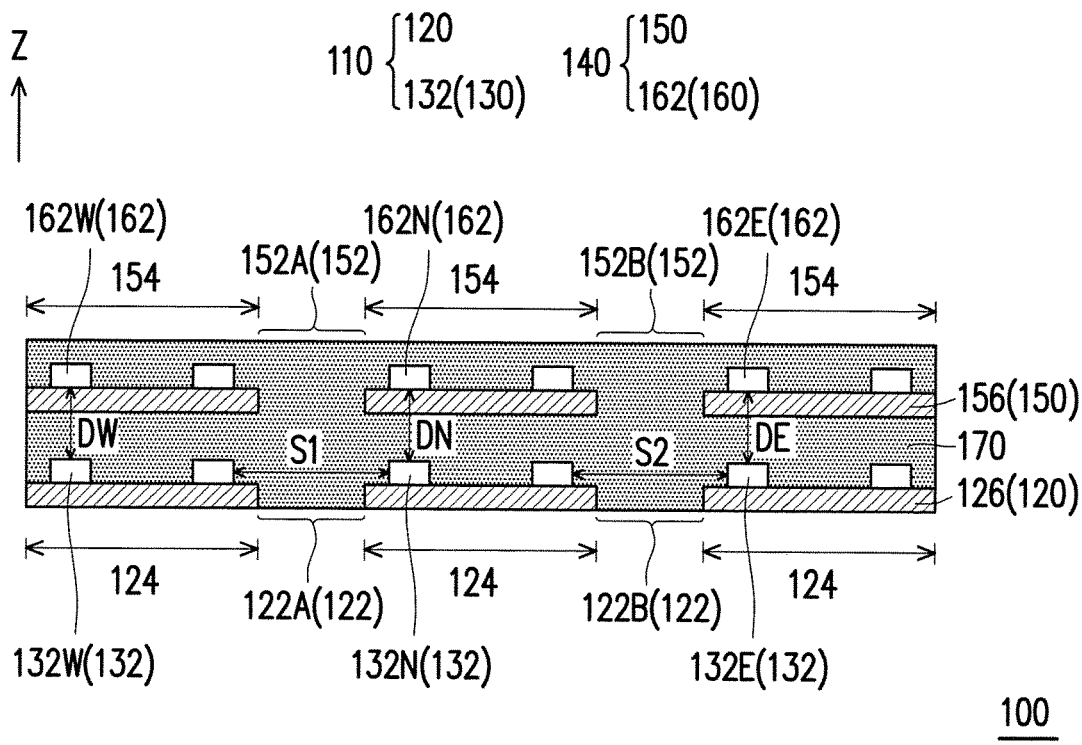
FIG. 1D is a schematic cross-sectional view illustrating a double-layer stretchable sensing device according to a first embodiment of the present disclosure.

FIG. 1D is a schematic cross-sectional view illustrating a double-layer stretchable sensing device according to a first embodiment of the present disclosure. A stretchable sensing device 100 includes at least one first unit structure 110, at least one second unit structure 140 and a stretchable material layer 170. The first unit structure 110 may substantially be referred to the first unit structure 110 of the previous stretchable sensing device 10. The second unit structure 140 includes a second substrate 150 and a second sensing element layer 160, wherein the second sensing element layer 160 is located on the second substrate 150. The stretchable material layer 170 is located between the first unit structure 110 and the second unit structure 140, and the first sensing electrodes 132 is located between the stretchable material layer 170 and the first substrate 120. In the present embodiment, the second substrate 150 of the second unit structure 140 has a plurality of second slits 152 and a plurality of second distribution regions 154 defined by the second slits 152. The second sensing element layer 160 includes a plurality of second sensing electrodes 162 which are electrically isolated to each other, wherein the second sensing electrodes 162 are located in the second distribution regions 154, and the second substrate 150 is located between the second sensing electrodes 162 and the stretchable material layer 170.

In the present embodiment, the second substrate 150 of the second unit structure 140 and the first substrate 120 of the first unit structure 110 may be overlapped (e.g., orthographic projections of the first distribution regions 124 of the first substrate 120 on the second substrate 150 may be overlapped with orthographic projections of the second distribution regions 154 of the second substrate 150 on the second substrate 150), the second sensing element layer 160 of the second unit structure 140 and the first sensing element layer 130 of the first unit structure 110 may be overlapped (e.g., an orthographic projection of the first sensing element layer 130 on the second substrate 150 may be overlapped with an orthographic projection of the second sensing element layer 160 on the second substrate 150), and the second slits 152, the second distribution regions 154 and the second sensing electrodes 162 are respectively disposed corresponding to the first slits 122, the first distribution regions 124 and the first sensing electrodes 132. That is, in the stretchable sensing device 100 of the present embodiment, the structural design of the second unit structure 140 may be substantially the same as that of the first unit structure 110, and the two unit structures may be disposed at two opposite sides of the stretchable material layer 170 by means of aligning with each other, but the present disclosure is not limited thereto. The second sensing electrodes 162 are distributed on the second distribution regions 154 of the second substrate 150, such as being meanderingly distributed in conformity with a part of the second slits 152, and the first sensing electrodes 132 and the second sensing electrodes 162 may be overlapped (i.e., orthographic projections of the first sensing electrodes 132 on the second substrate 150 may be overlapped with orthographic projections of the second sensing electrodes 162 on the second substrate 150).

Since in the present embodiment that the second unit structure 140 has the structure design similar to that of the first unit structure structural unit 110, the sensing modes of the first unit structure 110 may also be applied to the second unit structure 140. Namely, the present embodiment may use a second signal value measured from the second sensing electrodes 162 in the second sensing element layer 160 to determine the deformation state of the second unit structure 140 (or the second slits 152).

In FIG. 1D, only three second sensing electrodes 162E, 162W and 162N are schematically illustrated, and the three second sensing electrodes 162E, 162W and 162N are electrically isolated to each other. The first sensing electrode 132W and the second sensing electrode 162W have a first vertical spacing DW therebetween, the first sensing electrode 132E and the second sensing electrode 162E have a second vertical spacing DE therebetween, and the first sensing electrode 132N and the second sensing electrode 162N have a third vertical spacing DN therebetween. The present embodiment may obtain the corresponding third signal value by executing an inductive capacitance sensing between the first sensing electrode 132 and the second sensing electrode 162 which are adjacent to each other, so as to determine the deformation state of the stretchable sensing device 100 in the Z-direction.

Specifically, in the stretchable sensing device 100 of FIG. 1D, the first vertical spacing DW, the second vertical spacing DE and the third vertical spacing DN each enables a third signal value to be generated between the corresponding first sensing electrode 132E, 132W, 132N and the corresponding second sensing electrode 162E, 162W, 162N, and the third signal value may be changed corresponding to the deformation state of the stretchable sensing device 100 in the Z-direction. The stretchable sensing device 100 may use the first signals measured from the first sensing electrodes 132E, 132W and 132N to adopt the method as described in FIG. 1C or use the second signals measured from the second sensing electrodes 162E, 162W and 162N to adopt the method as described in FIG. 1C to determine the deformation condition of the stretchable sensing device 100 on a plane perpendicular to the Z-direction. In addition, the stretchable sensing device 100 may further use the third signals measured from the first sensing electrodes 132E, 132W and 132N and the second sensing electrodes 162E, 162W and 162N to determine the deformation condition of the stretchable sensing device 100 in the Z-direction. In general, the present embodiment may determine the overall deformation state of the stretchable sensing device 100 in a three-dimensional space.

For example, when the third vertical variance ΔDN determined by the signal variance between the first sensing electrode 132N and the second sensing electrode 162N is greater than the first vertical variance ΔDW determined by the signal variance between the first sensing electrode 132W and the second sensing electrode 162W, it may determined that a region between the first sensing electrode 132N and the second sensing electrode 162N has a greater deformation, and that a region between the first sensing electrode 132W and the first sensing electrode 162W has a less deformation. Alternatively, when the third vertical variance ΔDN is greater than the second vertical variance ΔDE determined by the signal variance between the first sensing electrode 132E and the second sensing electrode 162E, it may determined that a region between the first sensing electrode 132N and the second sensing electrode 162N has a greater deformation, and a region between the first sensing electrode 132E and the second sensing electrode 162E has a less deformation. After combining the measured variances with the corresponding position information, the deformation state of the entire stretchable sensing device 100 may be obtained.

Additionally, the first vertical variance ΔDW, the second vertical variance ΔDE and the third vertical variance ΔDN may be produced under a variety of use methods. For example, the stretchable sensing device 100 may serve as a device for touch sensing. At this moment, a touch pressing action of the user may cause the stretchable material layer 170 at a position being touched to be deformed in the Z-direction, but the stretchable material layer 170 at the region not being touched may not be deformed. The stretchable sensing device 100 may determine the touch position by a position corresponded to an occurrence of change in the third signal value of the first sensing electrodes 132 or the second sensing electrodes 162. In another embodiment, the stretchable sensing device 100 may conformably cover a surface of a predetermined three-dimensional object. At this moment, a part of the first slits 122 or the second slits 152 in the stretchable sensing device 100, and even all the first slits 122 or all the second slits 152, may be deformed. Therefore, the stretchable sensing device 100 may determine the deformations states of the stretchable sensing device 100 at individual regions with the variances of the first signal values measured from the first sensing electrodes 132, or with the variances of the second signal values measured from the second sensing electrodes 162, or with the variances of the third signal values measured between the first sensing electrodes 132 and the second sensing electrodes 162.

In the following, the stretchable sensing device is described using different embodiments. It is to be noted that, the following embodiments have adopted component notations and part of the contents from the previous embodiment, wherein the same notations are used for representing the same or similar components, and descriptions of some of the technical contents are omitted. The descriptions regarding the omitted part may be referred to the previous embodiment, and thus are not repeated in the following embodiments.

Figure 2:
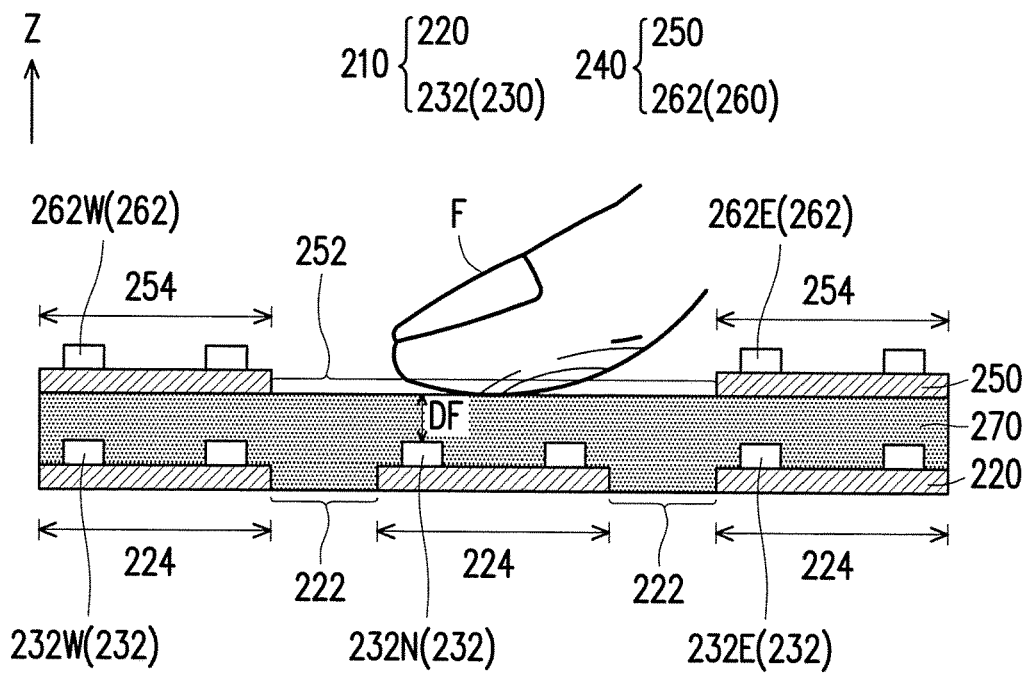
FIG. 2 is a schematic cross-sectional view illustrating a double-layer stretchable sensing device according to a second embodiment of the present disclosure.

FIG. 2 is a schematic cross-sectional view illustrating a double-layer stretchable sensing device according to a second embodiment of the present disclosure. A double-layer stretchable sensing device 200 of the second embodiment is similar to the stretchable sensing device 100 of FIG. 1D. In FIG. 2, notations identical or similar to that of FIGS. 1A~1D represent the same or similar components, and thus components already described in FIGS. 1A~1D may be referred to the previous descriptions and will be briefly described herein.

In the present embodiment, the stretchable sensing device 200 includes the first unit structure 210, the second unit structure 240 and the stretchable material layer 270, wherein the stretchable material layer 270 is located between the first unit structure 210 and the second unit structure 240, and the second unit structure 240 is disposed at a side closer to the user. The first unit structure 210 includes the first substrate 220 having the first slits 222 and the first sensing element layer 230 disposed on the first distribution regions 224 of the first substrate 220, and the second unit structure 240 includes the second substrate 250 having the second slits 252 and the second sensing element layer 260 disposed on the second distribution regions 254 of the second substrate 250. In addition, the first sensing element layer 230 includes the first sensing electrodes 232 (232W, 232N and 232E), and the second sensing element layer 260 includes the second sensing electrodes 262 (262W and 262E).

In the present embodiment, the design of the first unit structure 210 may be similar to that of the first unit structure 110 of the previous embodiments. The second substrate 250 is overlapped with a portion of the first substrate 220, and the second sensing element layer 260 is overlapped with a portion of the first sensing element layer 230; however, the size of the second slits 252 is different from that of the first slits 222. Herein, the illustration is provided by using the size of the second slits 252 being greater than the size of the first slits 222 as an example.

In the present embodiment, since the size of the second slits 252 is greater, when the user touches the stretchable sensing device 200 by a finger F or other means, a region of the stretchable sensing device 200 being touched may be located in the second slit 252 between the second sensing electrode 262E and the second sensing electrode 262W, that is, above the first sensing electrode 232N. At this moment, the first sensing electrode 232N and a surface of the stretchable sensing device 200 being touched (namely, a contact surface of the finger F) have a touch vertical spacing DF therebetween. The first sensing electrode 232N may execute the self-capacitance sensing mode and measure the corresponding first signal value, so as to determine a touch action corresponded to the finger F. Moreover, the self-capacitance sensing mode may be repeated to determine the deformation state of the stretchable sensing device 200 caused by the touch action corresponded to the finger F with the variances of the first signal values obtained during multiple measurements. For example, when a touch pressing force of the user is greater, it causes the stretchable material layer 270 at the position being touched to produce a larger deformation in the Z-direction, thereby resulting in a smaller vertical spacing DF. Relatively, when the touch pressing force of the user is smaller, it causes the stretchable material layer 270 at the position being touched to produce a smaller deformation in the Z-direction, thereby resulting in a larger vertical spacing DF. The first signal values produce different variances under the above two cases, and thus the magnitude of the touch pressing force may be determined using the variances of the first signal values.

Moreover, the stretchable material layer 270 as subjected to an effect of the external force may be deformed, and a width of the second slit 252 between the second sensing electrode 262E and the second sensing electrode 262W may also be changed due to the touch action of the finger F. Therefore, the stretchable sensing device 200 may also use a variation of the corresponding second signal values measured by executing the mutual-capacitance sensing mode between the second sensing electrode 262E and the second sensing electrode 262W to determine the touch action of the finger F.

Figure 3:
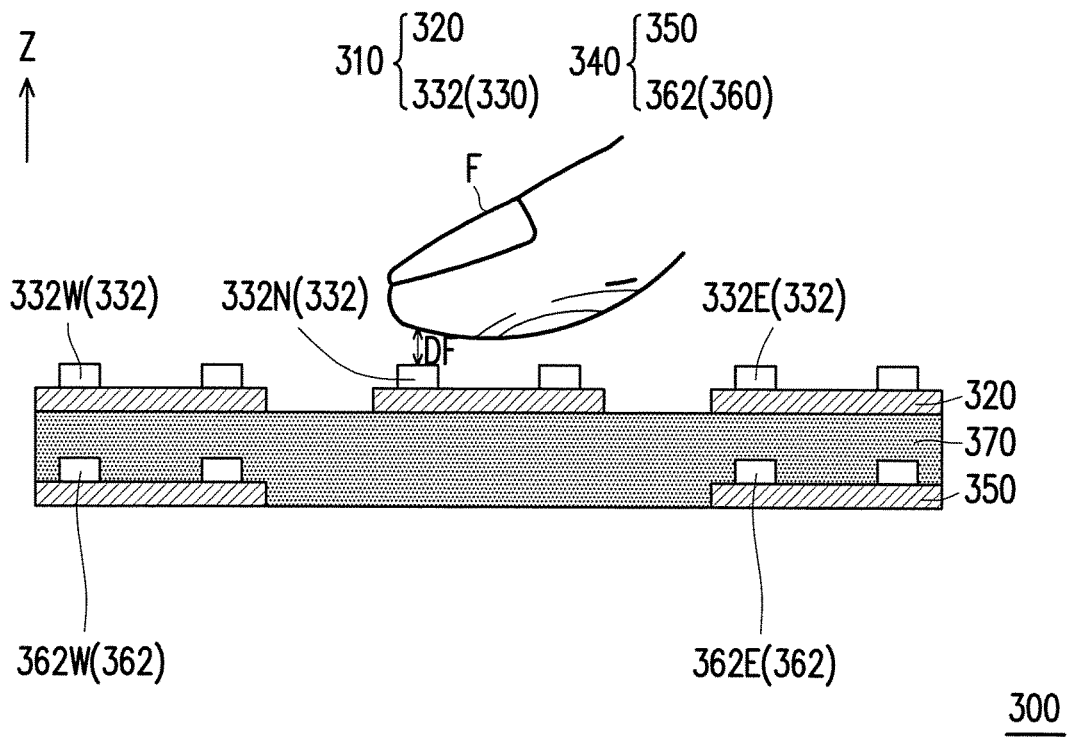
FIG. 3 is a schematic cross-sectional view illustrating a double-layer stretchable sensing device according to a third embodiment of the present disclosure.

FIG. 3 is a schematic cross-sectional view illustrating a double-layer stretchable sensing device according to a third embodiment of the present disclosure. A double-layer stretchable sensing device 300 of the third embodiment is similar to the stretchable sensing device 200 of FIG. 2. In FIG. 3, notations identical or similar to that of FIG. 2 or FIGS. 1A~1D represent the same or similar components, and thus components already described in the previous embodiments will not be described in detail herein.

In the present embodiment, the stretchable sensing device 300 includes the first unit structure 310, the second unit structure 340 and the stretchable material layer 370, wherein the stretchable material layer 370 is located between the first unit structure 310 and the second unit structure 340, and the first unit structure 310 is disposed at a side closer to the user. The first unit structure 310 includes the first substrate 320 and the first sensing element layer 330 disposed on the first substrate 320, and the second unit structure 340 includes the second substrate 350 and the second sensing element layer 360 disposed on the second substrate 350. In addition, the first sensing element layer 330 includes the first sensing electrodes 332 (332W, 332N and 332E), and the second sensing element layer 360 includes the second sensing electrodes 362 (362W and 362E).

In the present embodiment, the design of the first unit structure 310 may be similar to that of the first unit structure 110 of the previous embodiments. The second substrate 350 is overlapped with a portion of the first substrate 320, and the second sensing element layer 360 is overlapped with a portion of the first sensing element layer 330; however, a size of the slit on the second substrate 350 is different from that on the first substrate 320. Moreover, the first substrate 320 is located between the first sensing element layer 330 and the second sensing element layer 360, and the second sensing element layer 360 is located between the first substrate 320 and the second substrate 350.

When the user touches the stretchable sensing device 300 by the finger F or other means, a region of the stretchable sensing device 300 being touched may be located above the first sensing electrode 332N. At this moment, the first sensing electrode 332N and a surface of the finger F have a touch vertical spacing DF therebetween. In the present embodiment, a corresponding touch action may be determined with the variances of the first signal values measured by using the first sensing electrode 332N to execute the self-capacitance sensing mode for multiple times. For example, the touch pressing action of the user may cause the first sensing electrode 332N at the position being touched to produce a self-capacitance change, while the first sensing electrode 332W and the first sensing electrode 332E may have no obvious self-capacitance change. Under the self-capacitance sensing mode, the stretchable sensing device 300 may determine the touch position by a position corresponded to an occurrence of change in the first signal value of the first sensing electrode 332N.

Moreover, the touch action of the finger F may cause the stretchable material layer 370 to deform, thereby causing a capacitance value between two of the first sensing electrodes 332W, 332N and 332E adjacent to each other to be changed, causing a capacitance value between the second sensing electrodes 362W and 362E to be changed, and causing a capacitance value between the first sensing electrode 332W and the second sensing electrode 362W and/or between the first sensing electrode 332E and the second sensing electrode 362E to be changed. The deformation state of the stretchable sensing device 300 when being touched may be determined with the variances of the first signal values measured from the first sensing electrodes 332, the variances of the second signal values measured from the second sensing electrodes 362 and the variances of the third signal values measured between the first sensing electrodes 332 and the second sensing electrodes 362.

Figure 4:
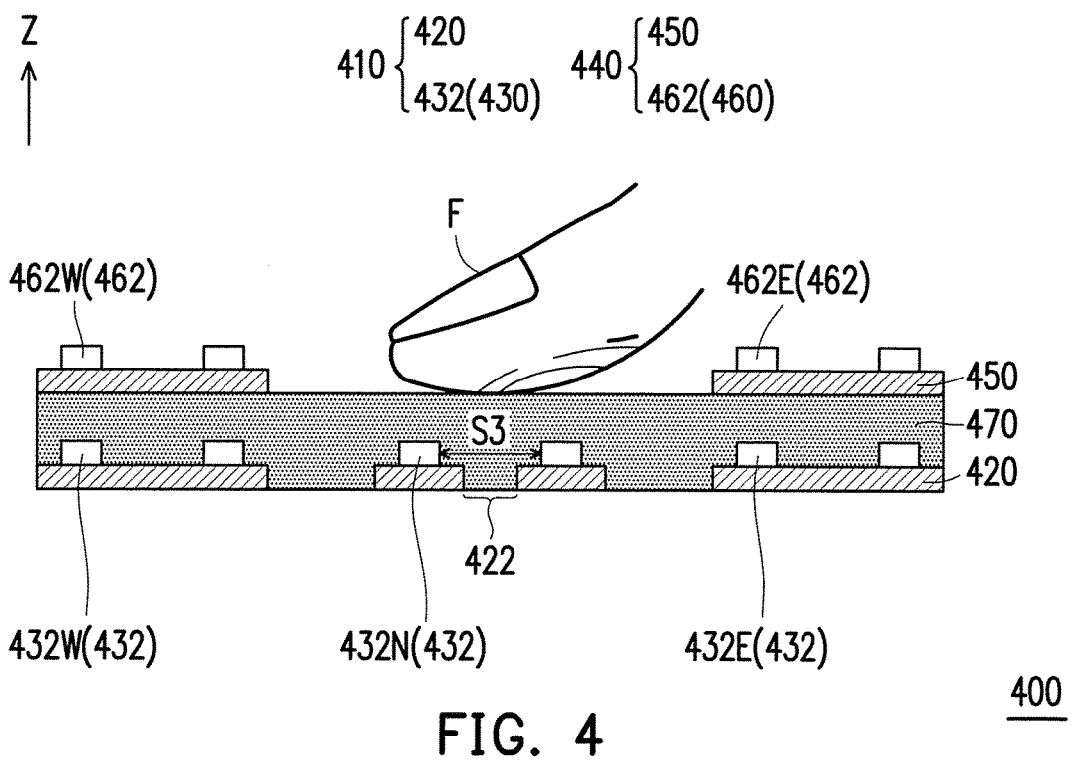
FIG. 4 is a schematic cross-sectional view illustrating a double-layer stretchable sensing device according to a fourth embodiment of the present disclosure.

FIG. 4 is a schematic cross-sectional view illustrating a double-layer stretchable sensing device according to a fourth embodiment of the present disclosure. A double-layer stretchable sensing device 400 of the fourth embodiment is similar to the stretchable sensing device 200 of FIG. 2. In FIG. 4, notations identical or similar to that of FIGS. 1A~1D and FIG. 2 represent the same or similar components, and thus components already described in FIG. 2 will not be described in detail herein.

In the present embodiment, the stretchable sensing device 400 includes the first unit structure 410, the second unit structure 440 and the stretchable material layer 470, wherein the stretchable material layer 470 is located between the first unit structure 410 and the second unit structure 40, and the second unit structure 440 is disposed at a side closer to the user. The first unit structure 410 includes the first substrate 420 and the first sensing element layer 430 disposed on the first substrate 420, and the second unit structure 140 includes the second substrate 450 and the second sensing element layer 460 disposed on the second substrate 450. In addition, the first sensing element layer 430 includes the first sensing electrodes 432 (432W, 432N and 432E), and the second sensing element layer 460 includes the second sensing electrodes 462 (462W and 462E).

In the present embodiment, the second substrate 450 is overlapped with a portion of the first substrate 420, the second sensing element layer 460 is overlapped with a portion of the first sensing element layer 430, but a position corresponded to a slit of the second substrate 450 is disposed with two portions of the first sensing electrodes 432N, and the first substrate 420 has the first slit 422 between the two portions of the first sensing electrodes 432N. The first slit 422 is filled with the stretchable material layer 470 therein so as to provide a changeable third horizontal spacing S3 between the two portions of the first sensing electrodes 432N.

When the stretchable sensing device 400 is used as a device for touch sensing, the user by performing a touch pressing action with the finger F or other object causes the third horizontal spacing S3 to be changed. At this moment, an electric field between the two portions of the first sensing electrodes 432N is also changed. When the two portions of the first sensing electrodes 432N are electrode structures integrated with each other, the first sensing electrodes 432N may be used to execute the self-capacitance sensing mode to obtain a first sensing value corresponded to the aforesaid touch action. When the two portions of the first sensing electrodes 432N are two electrode structures that are independent of each other, the two portions of the first sensing electrodes 432N may be used to execute an inductive capacitance sensing mode to obtain a first sensing value corresponded to the aforesaid touch action.

Moreover, the touch action of the finger F may cause the stretchable material layer 470 to deform, thereby causing a capacitance value between two of the first sensing electrodes 432W, 432N and 432E adjacent to each other to be changed, causing a capacitance value between the second sensing electrodes 462W and 462E to be changed, and causing a capacitance value between the first sensing electrode 432W and the second sensing electrode 462W and/or between the first sensing electrode 432E and the second sensing electrode 462E to be changed. The deformation state of the stretchable sensing device 400 when being touched may be determined with the variances of the first signal values measured from the first sensing electrodes 432, the variances of the second signal values measured from the second sensing electrodes 462 and the variances of the third signal values measured between the first sensing electrodes 432 and the second sensing electrodes 462.

Figure 5:
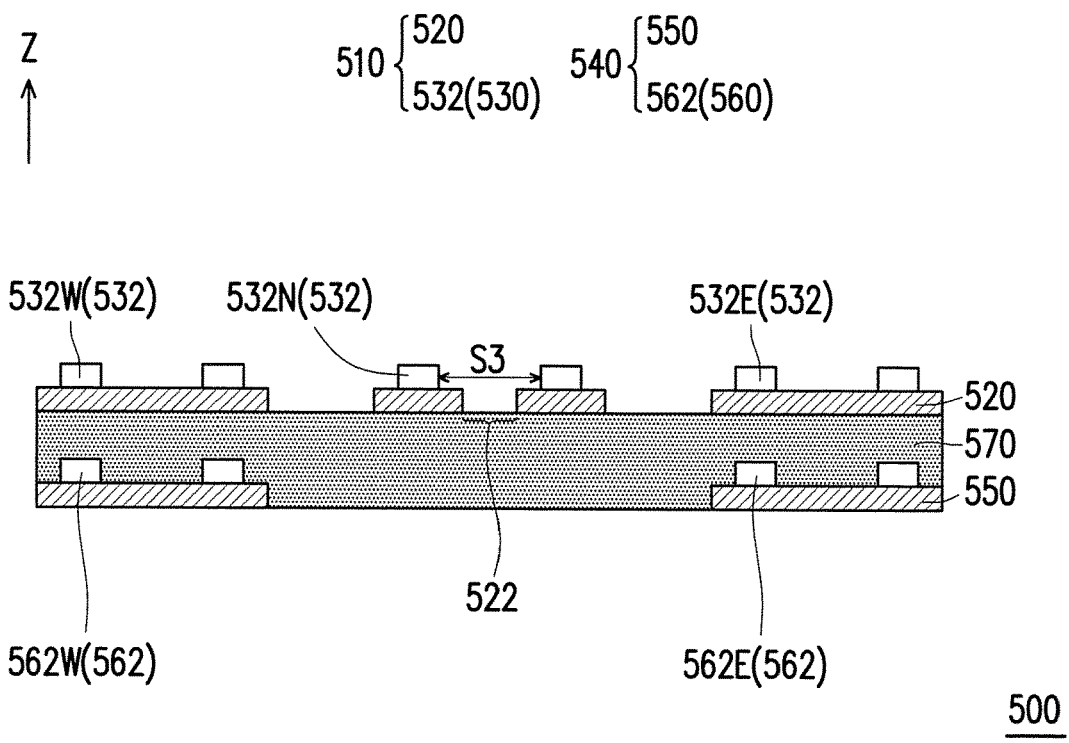
FIG. 5 is a schematic cross-sectional view illustrating a double-layer stretchable sensing device according to a fifth embodiment of the present disclosure.

FIG. 5 is a schematic cross-sectional view illustrating a double-layer stretchable sensing device according to a fifth embodiment of the present disclosure. A double-layer stretchable sensing device 500 of the fifth embodiment is similar to the stretchable sensing device 400 of FIG. 4.

In the present embodiment, the stretchable sensing device 500 includes the first unit structure 510, the second unit structure 540 and the stretchable material layer 570, wherein the stretchable material layer 570 is located between the first unit structure 510 and the second unit structure 540, and the first unit structure 510 disposed at a side closer to the user. The first unit structure 510 includes the first substrate 520 and the first sensing element layer 530 disposed on the first substrate 520, and the second unit structure 540 includes the second substrate 550 and the second sensing element layer 560 disposed on the second substrate 550. In addition, the first sensing element layer 530 includes the first sensing electrodes 532 (532W, 532N and 532E), and the second sensing element layer 560 includes the second sensing electrodes 562 (562W and 562E).

The first substrate 520 is located between the first sensing element layer 530 and the second sensing element layer 560, and the second sensing element layer 560 is located between the first substrate 520 and the second substrate 550. In the present embodiment, a position corresponded to a slit of the second substrate 550 is disposed with two portions of the first sensing electrodes 532N, and the first substrate 520 has the first slit 522 between the two portions of the first sensing electrodes 532N. The first slit 522 is filled with the stretchable material layer 570 therein so as to provide a changeable third horizontal spacing S3 between the two portions of the first sensing electrodes 532N.

Figure 6:
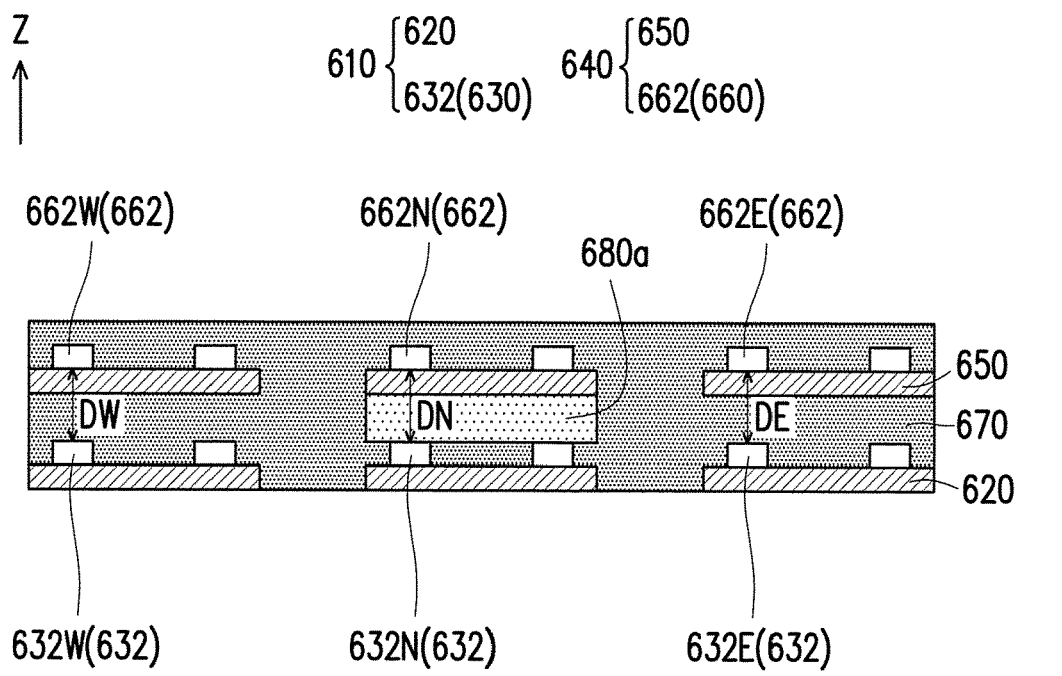
FIG. 6 is a schematic cross-sectional view illustrating a double-layer stretchable sensing device according to a sixth embodiment of the present disclosure.

FIG. 6 is a schematic cross-sectional view illustrating a double-layer stretchable sensing device according to a sixth embodiment of the present disclosure. A double-layer stretchable sensing device 600 of the sixth embodiment is similar to the stretchable sensing device 100 of FIG. 1D. In FIG. 6, notations identical or similar to that of FIGS. 1A~1D represent the same or similar components, and thus components already described in FIGS. 1A~1D may be referred to the previous descriptions and will be briefly described herein.

In the present embodiment, the stretchable sensing device 600 includes the first unit structure 610, the second unit structure 640 and the stretchable material layer 670, wherein the stretchable material layer 670 is located between the first unit structure 610 and the second unit structure 640. The first unit structure 610 includes the first substrate 620 having the slits and the first sensing element layer 630 disposed on the first substrate 620, and the second unit structure 240 includes the second substrate 650 having the slits and the second sensing element layer 660 disposed on the second substrate 650. In addition, the first sensing element layer 630 includes the first sensing electrodes 632 (632W, 632N and 632E), and the second sensing element layer 660 includes the second sensing electrodes 662 (662W, 662N and 662E). In the present embodiment, designs of the first unit structure 610 and the second unit structure 640 may be similar to that of the first unit structure 110 and the second unit structure 140 of the previous embodiments.

In addition, the first sensing electrodes 632N and the second sensing electrodes 662N further have a first insulating layer 680a therebetween, and a Young's modulus of the first insulating layer 680a may be greater than that of the stretchable material layer 670. In the present embodiment, a third vertical spacing DN between the first sensing electrode 632N and the second sensing electrode 662N does not change much. Specifically, when the stretchable sensing device 600 is deformed due to being subjected to an effect of the external force, the variance of the first vertical spacing DW and a variance of the second vertical spacing DE may be greater than the variance of the third vertical spacing DN. The third signal value obtained by performing an inductive capacitance sensing to the first sensing electrode 632N and the second sensing electrode 662N may be used as a correction signal value. In the present embodiment, a ratio of a Young's modulus of the first insulating layer 680a to a Young's modulus of the stretchable material layer 670 is greater than or equal to 10, but the present disclosure is not limited thereto.

In specific, the first signal values obtained by performing sensing on the first sensing electrodes 632 and the second signal values obtained by performing sensing on the second sensing electrodes 662 may change in correspondence to a stretching deformation state of the stretchable sensing device 600 in the X-Y plane, the third signal value corresponded to the third vertical spacing DN may substantially be unchanged, and the third signal values corresponded to the first vertical spacing DW and the second vertical spacing DE may change in correspondence to a stretching or compression deformation state of the stretchable sensing device 600 in the Z-direction. The present embodiment may determine the overall deformation state of the stretchable sensing device 600 in a three-dimensional space.

Figure 7:
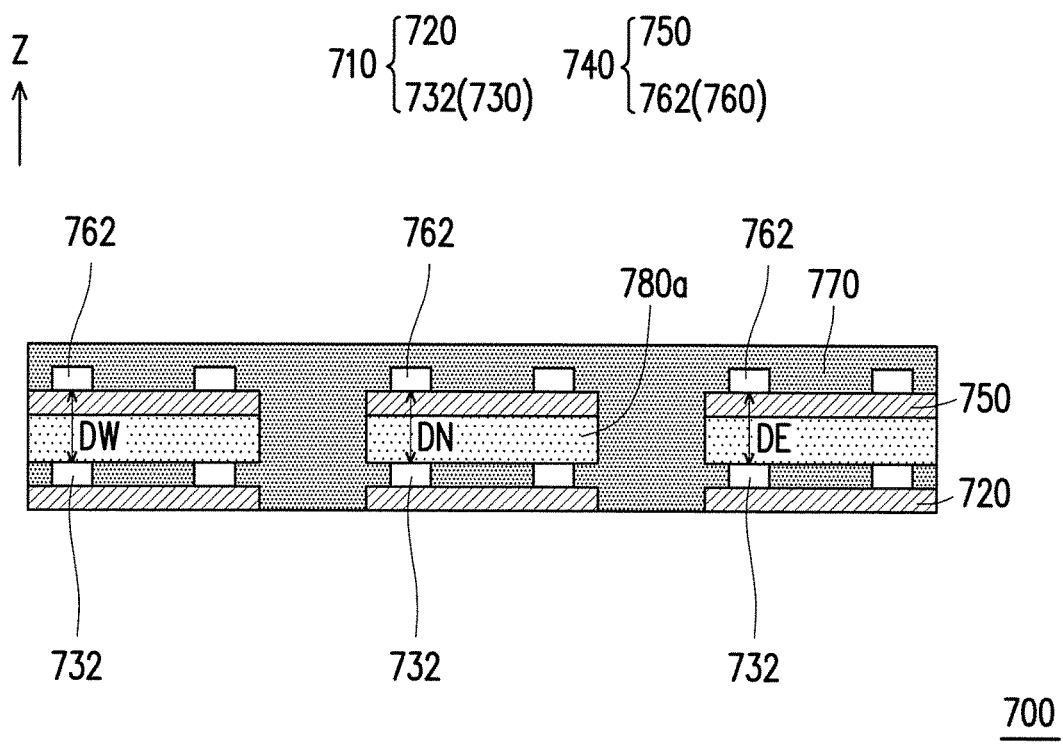
FIG. 7 is a schematic cross-sectional view illustrating a double-layer stretchable sensing device according to a seventh embodiment of the present disclosure.

FIG. 7 is a schematic cross-sectional view illustrating a double-layer stretchable sensing device according to a seventh embodiment of the present disclosure. A double-layer stretchable sensing device 700 of the seventh embodiment is similar to the stretchable sensing device 600 of FIG. 6. In FIG. 7, notations identical or similar to that of FIG. 6 represent the same or similar components, and thus components already described in FIG. 6 will not be described in detail herein.

In the present embodiment, the stretchable sensing device 700 includes the first unit structure 710, the second unit structure 740 and the stretchable material layer 770, wherein the stretchable material layer 770 is located between the first unit structure 710 and the second unit structure 740. The first unit structure 710 includes first substrate 720 having the slits and the first sensing element layer 730 disposed on the first substrate 720, and the second unit structure 740 includes the second substrate 750 having the slits and the second sensing element layer 760 disposed on the second substrate 750. In addition, the first sensing element layer 730 includes the first sensing electrodes 732, and the second sensing element layer 760 includes the second sensing electrodes 762. In the present embodiment, the designs of the first unit structure 710 and the second unit structure 740 may be similar to that of the first unit structure 110 and the second unit structure 140 of the previous embodiments.

Moreover, each first sensing electrode 732 and the corresponding second sensing electrode 762 have the first insulating layer 780a therebetween, and a Young's modulus of the first insulating layer 780a is greater than that of the stretchable material layer 770; thus, the first vertical spacing DW, the second vertical spacing DE and the third vertical spacing DN do not have much change. As a result, under a condition that the stretchable sensing device 700, after being subjected to the external force, has a corresponding deformation state, the third signal values between the first sensing electrodes 732 and the second sensing electrodes 762 do not have much change.

Figure 8:
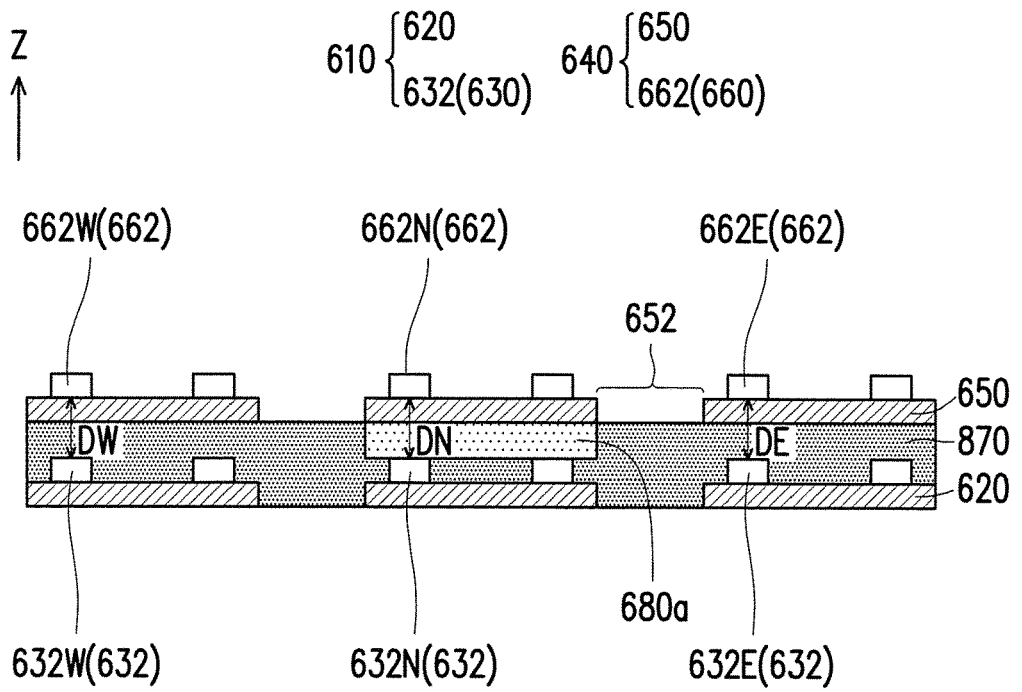
FIG. 8 is a schematic cross-sectional view illustrating a double-layer stretchable sensing device according to an eighth embodiment of the present disclosure.

FIG. 8 is a schematic cross-sectional view illustrating a double-layer stretchable sensing device according to an eighth embodiment of the present disclosure. A double-layer stretchable sensing device 800 of the eighth embodiment is similar to the stretchable sensing device 600 of FIG. 6. In FIG. 8, notations identical or similar to that of FIG. 6 represent the same or similar components, and thus components already described in FIG. 6 will not be described in detail herein. In the present embodiment, a thickness of the stretchable material layer 870 may be slimmer, and the stretchable material layer 870 does not fill into the second slits 652 of the second substrate 650. As a result, the second slits 652 of the second substrate 650 may be hollow.

Figure 9:
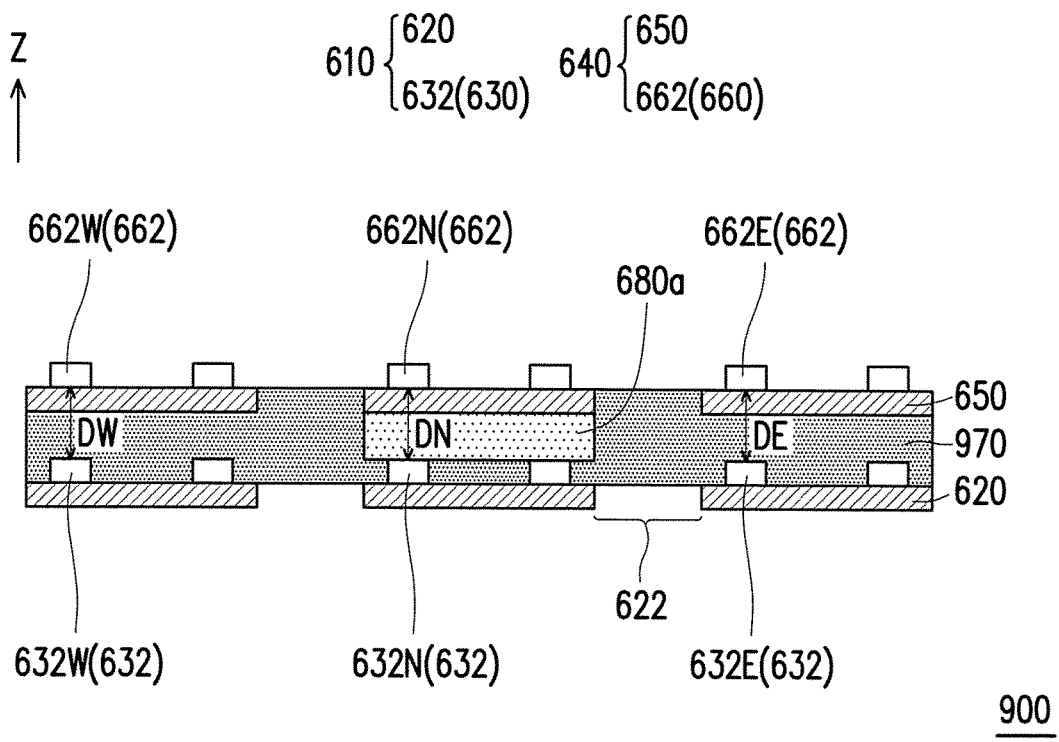
FIG. 9 is a schematic cross-sectional view illustrating a double-layer stretchable sensing device according to a ninth embodiment of the present disclosure.

FIG. 9 is a schematic cross-sectional view illustrating a double-layer stretchable sensing device according to a ninth embodiment of the present disclosure. A double-layer stretchable sensing device 900 of the ninth embodiment is similar to the stretchable sensing device 800 of FIG. 8. It is worth noted that, in FIG. 9, notations identical or similar to that of FIG. 8 represent the same or similar components, the embodiment of FIG. 8 is also similar to the embodiment of FIG. 6, and thus components already described in FIG. 8 or FIG. 6 will not be described in detail herein. In the present embodiment, a thickness of the stretchable material layer 970 may be slimier, and the stretchable material layer 970 does not fill into the first slits 622 of the first substrate 620. As a result, the first slits 622 of the first substrate 620 may be hollow.

Figure 10:
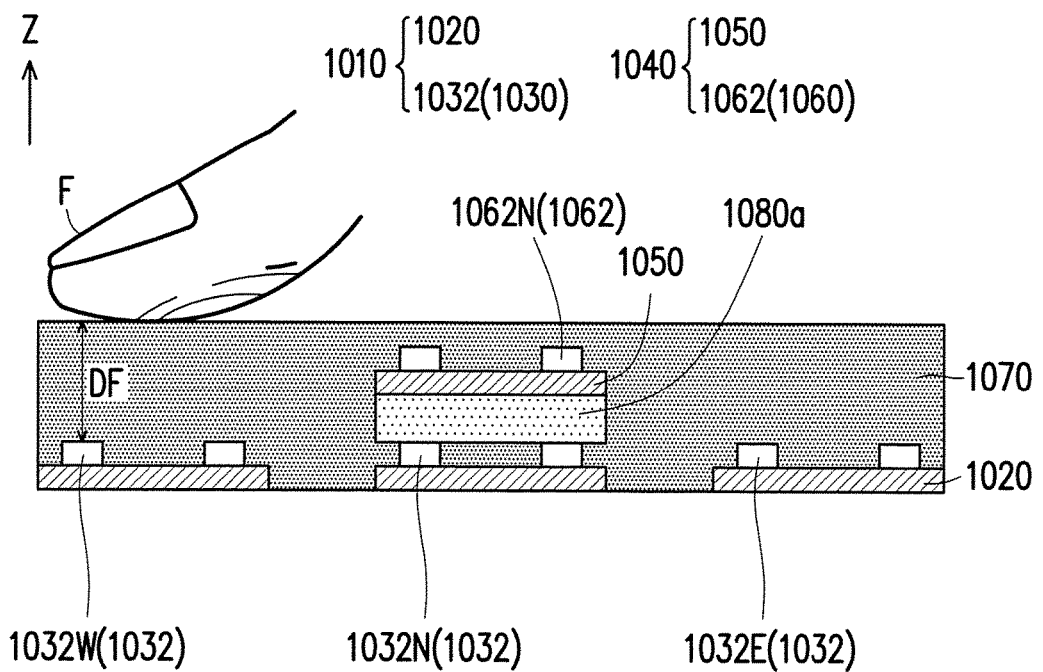
FIG. 10 is a schematic cross-sectional view illustrating a double-layer stretchable sensing device according to a tenth embodiment of the present disclosure.

FIG. 10 is a schematic cross-sectional view illustrating a double-layer stretchable sensing device according to a tenth embodiment of the present disclosure. A stretchable sensing device 1000 of the tenth embodiment is similar to the stretchable sensing device 600 of FIG. 6. In FIG. 10, notations identical or similar to that of FIG. 6 represent the same or similar components, and thus components already described in FIG. 6 will not be described in detail herein.

In the present embodiment, the stretchable sensing device 1000 includes the first unit structure 1010, the second unit structure 1040 and the stretchable material layer 1070, wherein the stretchable material layer 1070 is located between the first unit structure 1010 and the second unit structure 1040. The first unit structure 1010 has the first substrate 1020 having the slits and the first sensing element layer 1030 disposed on the first substrate 1020, and the second unit structure 1040 includes the second substrate 1050 having the slits and the second sensing element layer 1060 disposed on the second substrate 1050. In addition, the first sensing element layer 1030 includes the first sensing electrodes 1032, and the second sensing element layer 1060 includes the second sensing electrodes 1062. The first sensing electrode 1032N and the second sensing electrode 1062N has the first insulating layer 1080a therebetween, and a Young's modulus of the first insulating layer 1080a is greater than at of the stretchable material layer 1070. In the present embodiment, the design of the first unit structure 1010 may be similar to that of the first unit structure 110 of the previous embodiments.

The second substrate 1050 is overlapped with a portion of the first substrate 1020, the second sensing element layer 1060 is overlapped with a portion of the first sensing element layer 1030, and the stretchable material layer 1070 covers on the second sensing electrodes 1062. Specifically, in the present embodiment, the first sensing electrode 1032N and the second sensing electrode 1062N are overlapped. The second substrate 1050 does not cover above the first sensing electrode 1032W and the first sensing electrode 1032E.

In the present embodiment, the user may touch the stretchable material layer 1070 with the finger F or by other means. For example, if a region of the stretchable material layer 1070 being touched is located on the first sensing electrode 1032W, the first sensing electrode 1032W and a surface of the stretchable sensing device 1000 being touched has a touch vertical spacing DF. The first sensing electrode 1032W may execute the self-capacitance sensing mode and measure the corresponding first signal value, so as to determine a touch action corresponded to the finger F. Moreover, the self-capacitance sensing mode may be repeated to determine the deformation state of the stretchable sensing device 1000 caused by the touch action corresponded to the finger F with the variances of the first signal values obtained during multiple measurements. For example, in the case that a touch pressing force of the user is greater, it causes the stretchable material layer 1070 at the position being touched to produce a larger deformation in the Z-direction, thereby resulting in a smaller vertical spacing DF. Relatively, when the touch pressing force of the user is smaller, it causes the stretchable material layer 1070 at the position being touched to produce a smaller deformation in the Z-direction, thereby resulting in a larger vertical spacing DF. The first signal values produce different variances under the above two cases, and thus the magnitude of the touch pressing force may be determined using the variances of the first signal values.

Figure 11:
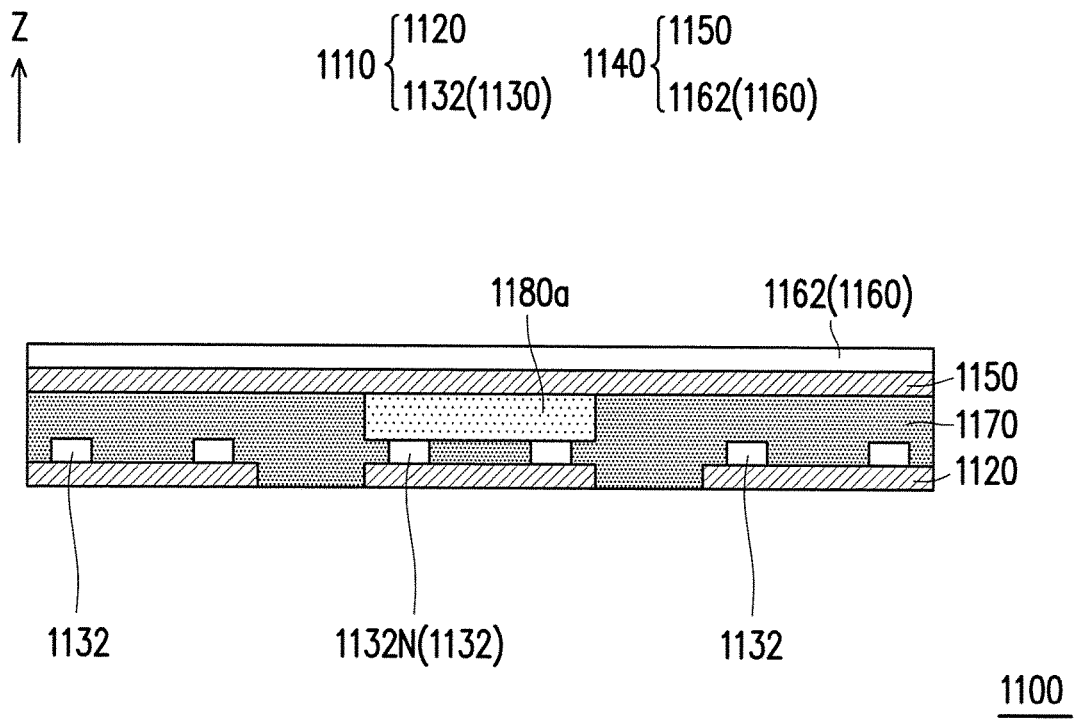
FIG. 11 is a schematic cross-sectional view illustrating a double-layer stretchable sensing device according to an eleventh embodiment of the present disclosure.

FIG. 11 is a schematic cross-sectional view illustrating a double-layer stretchable sensing device according to an eleventh embodiment of the present disclosure. A double-layer stretchable sensing device 1100 of the eleventh embodiment is similar to the stretchable sensing device 100 of FIG. 1D. In FIG. 11, notations identical or similar to that of FIGS. 1A~1D represent the same or similar components, and thus components already described in FIGS. 1A~1D will not be described in detail herein.

In the present embodiment, the stretchable sensing device 1100 includes the first unit structure 1110, the second unit structure 1140 and the stretchable material layer 1170, wherein the stretchable material layer 1170 is located between the first unit structure 1110 and the second unit structure 1140. The first unit structure 1110 includes the first substrate 1120 having the slits and the first sensing element layer 1130 disposed on the first substrate 1120, and the second unit structure 1140 includes the whole surface of the second substrate 1150 and the second sensing element layer 1160 disposed on the second substrate 1150. In addition, the first sensing element layer 1130 includes the first sensing electrodes 1132, and the second sensing element layer 1160 includes the second sensing electrode 1162. The first sensing electrode 1132N and the second sensing electrode 1162 have a first insulating layer 1180a therebetween, and a Young's modulus of the first insulating layer 1180a may be greater than that of the stretchable material layer 1170. In the present embodiment, the design of the first unit structure 1110 may be similar to that of the first unit structure 110 of the previous embodiments.

The second sensing electrode 1162 of the second sensing element layer 1160 is, for example, located on the second substrate 1150 in a manner of complete coverage, the second substrate 1150 is located between the first sensing element layer 1130 and the second sensing element layer 1160, and the first sensing element layer 1130 is located between the first substrate 1120 and the second substrate 1150. In detail, in the present embodiment, the second sensing electrode 1162 may, for example, be a common electrode. For example, the second sensing electrode 1162 may be grounded or electrically connected to a common voltage VSS. The present embodiment may obtain the third signal value by performing an inductive capacitance sensing between the first sensing electrodes 1132 and the second sensing electrode 1162 so as to determine the deformation state of the stretchable sensing device 1100 in the Z-direction.

In another embodiment, the second sensing element layer 1160 may be patterned to include at least one second sensing electrode 1162, wherein only one second sensing electrode 1162 is schematically illustrated in the cross-sectional view of FIG. 11, and in a top view or other perspective view, the second sensing element layer 1160 may include a plurality of second sensing electrodes 1162 with independent structures. Extending directions of the first sensing electrodes 1132 may respectively be intersected with the respective second sensing electrodes 1162, or a partial area of the respective second sensing electrodes 1162 may be overlapped with a partial area of one or more of the first sensing electrodes 1132. As a result, the first sensing electrodes 1132 and the second sensing electrodes 1162 may perform mutual-capacitance sensing to obtain the third signal value, so as to determine the deformation state of the stretchable sensing device 1100 in the Z-direction.

Figure 12:
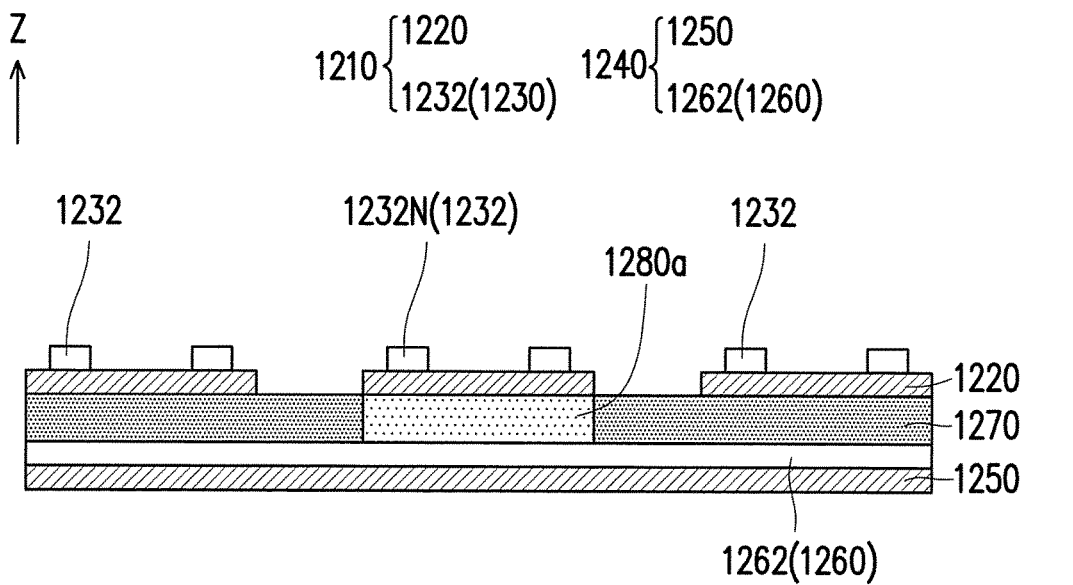
FIG. 12 is a schematic cross-sectional view illustrating a double-layer stretchable sensing device according to a twelfth embodiment of the present disclosure.

FIG. 12 is a schematic cross-sectional view illustrating a double-layer stretchable sensing device according to a twelfth embodiment of the present disclosure. A double-layer stretchable sensing device 1200 of the twelfth embodiment is similar to stretchable sensing device 1100 of FIG. 11. In FIG. 12, the same or similar notations represent the same or similar components, and thus components already described in FIG. 11 will not be described in detail herein.

In the present embodiment, the stretchable sensing device 1200 includes the first unit structure 1210, the second unit structure 1240 and the stretchable material layer 1270, wherein the stretchable material layer 1270 is located between the first unit structure 1210 and the second unit structure 1240. The first unit structure 1210 includes the first substrate 1220 having the slits and the first sensing element layer 1230 disposed on the first substrate 1220, and the second unit structure 1240 includes the whole surface of the second substrate 1250 and the second sensing element layer 1260 disposed on the second substrate 1250. In addition, the first sensing element layer 1230 includes the first sensing electrodes 1232, and the second sensing element layer 1260 includes the second sensing electrode 1262. The first sensing electrode 1232N and the second sensing electrode 1262 have a first insulating layer 1280a therebetween, and a Young's modulus of the first insulating layer 1280a may be greater than that of the stretchable material layer 1270. In the present embodiment, the design of the first unit structure 1210 may be similar to that of the first unit structure 110 of the previous embodiments. Moreover, the first substrate 1220 is located between the first sensing element layer 1230 and the second sensing element layer 1260, and the second sensing element layer 1260 is located between the first substrate 1220 and the second substrate 1250.

Figure 13:
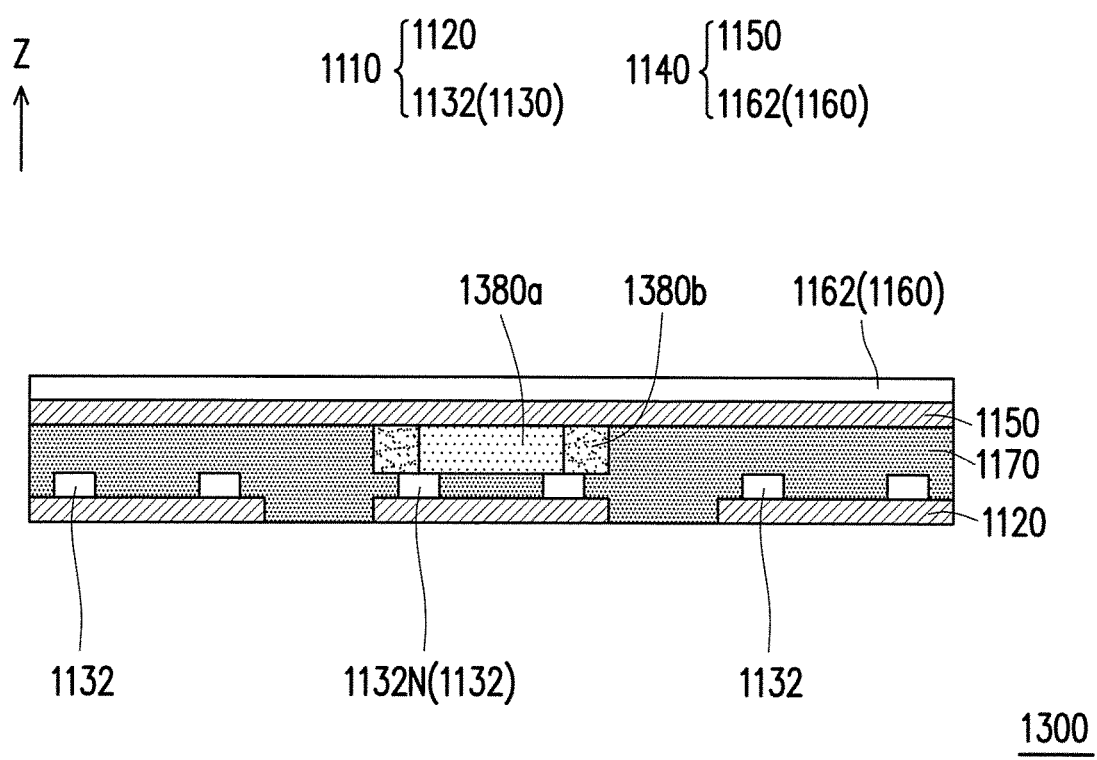
FIG. 13 is a schematic cross-sectional view illustrating a double-layer stretchable sensing device according to a thirteenth embodiment of the present disclosure.

FIG. 13 is a schematic cross-sectional view illustrating a double-layer stretchable sensing device according to a thirteenth embodiment of the present disclosure. A double-layer stretchable sensing device 1300 of the thirteenth embodiment is similar to the stretchable sensing device 1100 of FIG. 11. In FIG. 13, notations identical or similar to that of FIG. 11 represent the same or similar components, and thus components already described in FIG. 11 will not be described in detail herein. In the present embodiment, the first sensing electrode 1132N and the second sensing electrode 1162 further have a second insulating layer 1380b therebetween, wherein the second insulating layer 1380b is disposed at the periphery of the first insulating layer 1380a, and a forming method of the second insulating layer 1380b is similar to that of the first insulating layer 1380a, but the present disclosure is not limited thereto. A Young's modulus of the second insulating layer 1380b may be greater than that of the first insulating layer 1380a, and thus a vertical spacing between the first sensing electrode 1132N and the second sensing electrode 1162 does not change much. As a result, the third signal value obtained by performing an inductive capacitance sensing to the first sensing electrode 1132N and the second sensing electrode 1162 may be used as a correction signal value. In the present embodiment, a ratio of the Young's modulus of the second insulating layer 1380b to the Young's modulus of the first insulating layer 1380a may be greater than or equal to 10, but the present disclosure is not limited thereto.

Figure 14A:
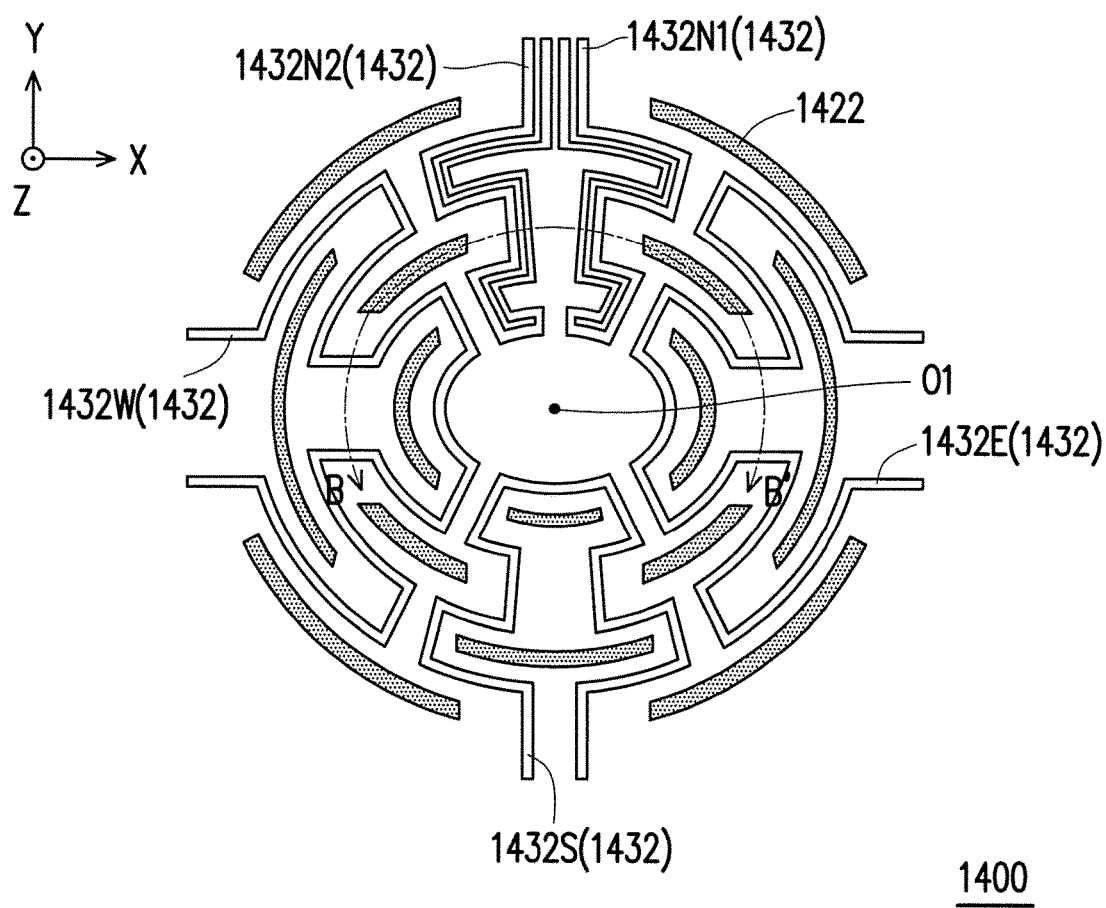
FIG. 14A is a schematic top view illustrating a double-layer stretchable sensing device according to a fourteenth embodiment of the present disclosure.
Figure 14B:
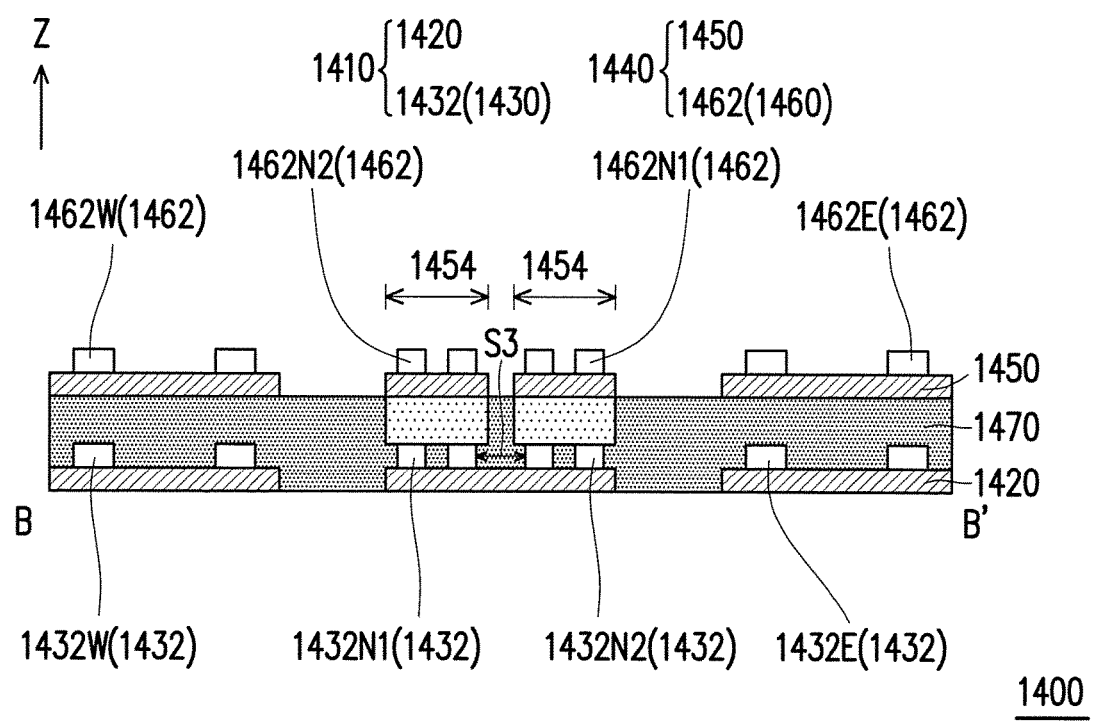
FIG. 14B is a schematic cross-sectional view illustrated along a section line B-B' in FIG. 14A.

FIG. 14A is a schematic top view illustrating a double-layer stretchable sensing device according to a fourteenth embodiment of the present disclosure, wherein some of the layers are not illustrated in FIG. 14A, and in FIG. 14A, the Z-direction is perpendicular to the X-direction and the Y-direction, and emits out of a direction of a plane in which FIG. 14A is drawn. FIG. 14B is a schematic cross-sectional view illustrated along a section line B-B' in FIG. 14A. A double-layer stretchable sensing device 1400 of the fourteenth embodiment is similar to the stretchable sensing device 800 of FIG. 8. In FIG. 14, notations identical or similar to that of FIG. 8 represent the same or similar components, and thus components already described in FIG. 8 will not be described in detail herein.

In the present embodiment, the stretchable sensing device 1400 includes the first unit structure 1410, the second unit structure 1440 and the stretchable material layer 1470, wherein the stretchable material layer 1470 is located between the first unit structure 1410 and the second unit structure 1440. The first unit structure 1410 includes the first substrate 1420 having the slits and the first sensing element layer 1430 disposed on the first substrate 1420, and the second unit structure 1440 includes the second substrate 1450 having the slits and the second sensing element layer 1460 disposed on the second substrate 1450. In addition, the first sensing element layer 1430 includes the first sensing electrodes 1432 (1432W, 1432N1, 1432N2, 1432E, and 1432S), and the second sensing element layer 1460 includes the second sensing electrodes 1462 (1462W, 1462N1, 1462N2, 1462E, and 1462S). In the present embodiment, a layout approach of the first sensing electrodes 1432 and the second sensing electrodes 1462 may be the same and layout areas thereof may overlap each other, and FIG. 14A merely illustrate the first sensing electrodes 1432 of the first unit structure 1410 and the slits of the first substrate 1420 to explain the layout approach.

It may be known from FIG. 14B, the two first sensing electrodes 1432N1 and 1432N2 are located on a same distribution region of the first substrate 1420 and are electrically isolated to each other. However, the two second sensing electrodes 1462N1 and 1462N2 are located on different second distribution regions 1454 and are electrically isolated to each other. In detail, the two first sensing electrodes 1432N1 and 1432N2 have a fixed third horizontal spacing S3 therebetween, and when the stretchable sensing device 1400 has a deformation state, the third horizontal spacing S3 does not change correspondingly. As a result, a first signal value obtained by performing an inductive capacitance sensing between the first sensing electrodes 1432N1 and 1432N2 may be used as a correction signal value.

In the stretchable sensing device of one embodiment of the present disclosure, a corresponding deformation state of the stretchable sensing device after being subjected to a force may be presumed by using capacitance values respectively detected between two sets of electrodes. In detail, in the stretchable sensing device 10 of FIG. 1A for example, the detection method may be to respectively detect an inductive capacitance value between the first sensing electrode 132N and the first sensing electrode 132S, an inductive capacitance value between the first sensing electrode 132W and the first sensing electrode 132E, an inductive capacitance value between the first sensing electrode 132N and the first sensing electrode 132W, or an inductive capacitance value between the first sensing electrodes 132S and 132E. The inductive capacitance values are compared with a preset value or a correction value to calculate the corresponding deformation state of the stretchable sensing device after being subjected to the force.

Figure 15:
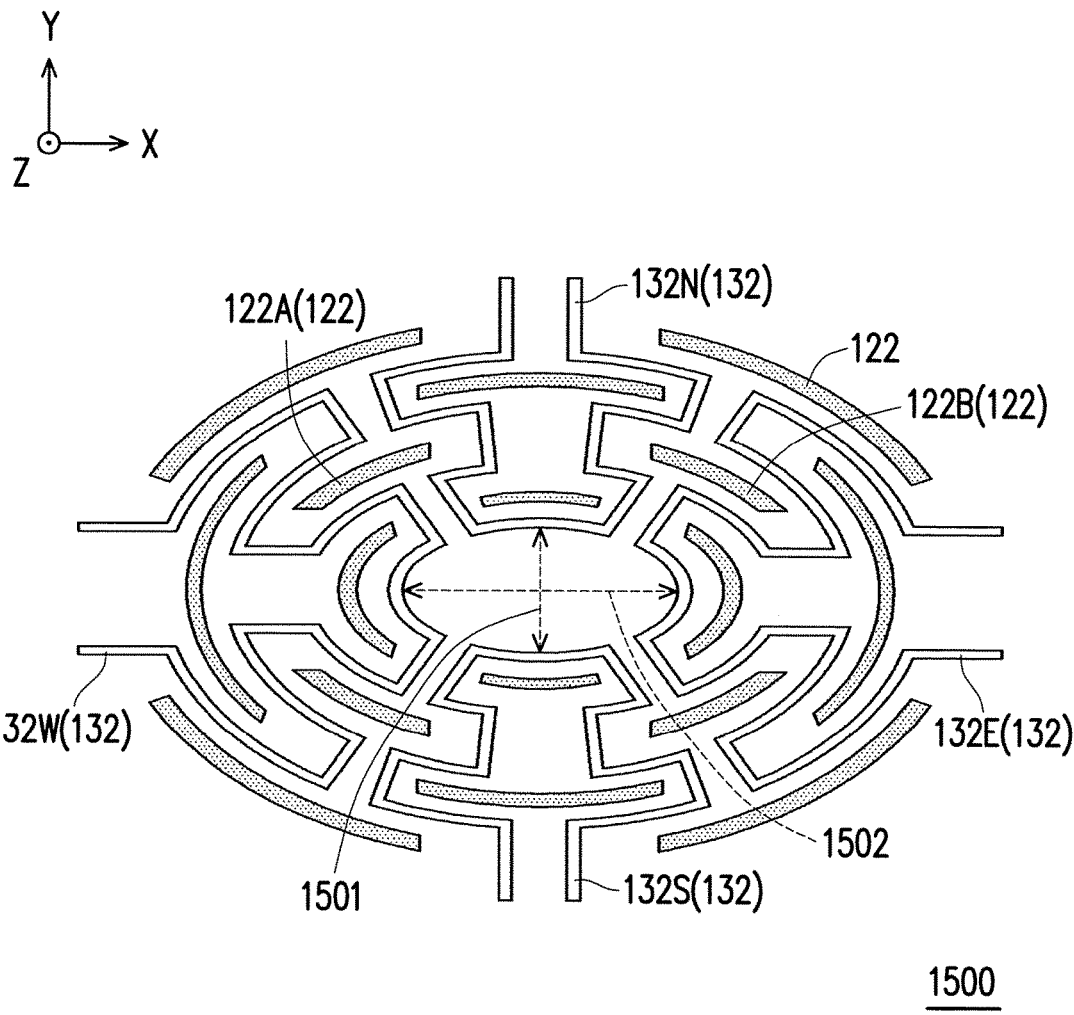
FIG. 15 is a schematic top view illustrating a corresponding deformation state of a stretchable sensing device when subjected to a compression force of the Y-direction according to an embodiment of the present disclosure.

Referring to FIG. 1A, FIG. 1B and FIG. 15 at the same time, FIG. 15 is a schematic top view illustrating a corresponding deformation state of a stretchable sensing device when subjected to an compression force of the Y-direction according to an embodiment of the present disclosure. Specifically, a stretchable sensing device 1500 of FIG. 15 is the corresponding deformation state of the stretchable sensing device 10 of FIG. 1A when subjected to an effect of the external force. In FIG. 15, the stretchable sensing device 1500 is subjected to an effect of the compression force in the Y-direction and produces a corresponding deformation. For example, as compared to the state of FIG. 1A and FIG. 1B, in FIG. 15, an electrode spacing 1501 between the first sensing electrode 132N and the first sensing electrode 132S becomes smaller, and an electrode spacing 1502 between the first sensing electrode 132W and the first sensing electrode 132E becomes larger. Take the capacitance value to be the electrical signal for example, because the capacitance value between the two conductors reduces as the distance therebetween increases, it may be presumed that an inductive capacitance value corresponded to the electrode spacing 1501 will increase with the deformation of the stretchable sensing device 1500, and an inductive capacitance value corresponded to the electrode spacing 1502 will decrease with the deformation of the stretchable sensing device 1500. After combining the corresponding position information with the variation relationship according to the aforementioned inductive capacitance values, the controller C of the stretchable sensing device 10 may determine the deformation of the stretchable sensing device 1500 so as to obtain the deformation state of the overall stretchable sensing device 1500.

Figure 16:
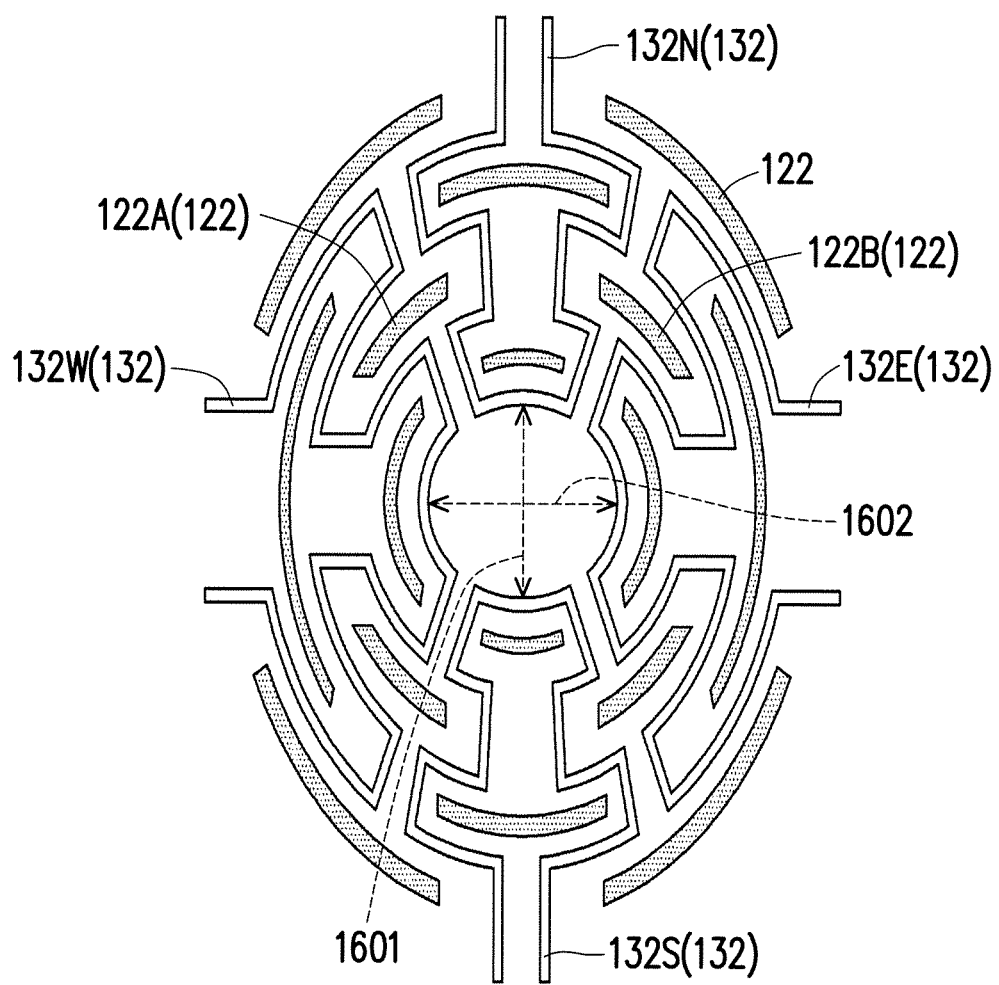
FIG. 16 is a schematic top view illustrating a corresponding deformation state of the stretchable sensing device when subjected to a compression force of the X-direction according to an embodiment of the present disclosure.

Referring to FIG. 1A, FIG. 1B and FIG. 16 at the same time, FIG. 16 is a schematic top view illustrating a corresponding deformation state of the stretchable sensing device when subjected to an compression force of the X-direction according to an embodiment of the present disclosure. Specifically, a stretchable sensing device 1600 of FIG. 16 is the corresponding deformation state of the stretchable sensing device 10 of FIG. 1A when subjected to an effect of the external force. In FIG. 16, the stretchable sensing device 1600 is subjected to an effect of the compression force in the X-direction and has a corresponding deformation. For example, as compared to the state of FIG. 1A and FIG. 1B, in FIG. 16, an electrode spacing 1601 between the first sensing electrode 132N and the first sensing electrode 132S becomes larger, and an electrode spacing 1602 between the first sensing electrode 132W and the first sensing electrode 132E becomes smaller. Take the capacitance value to be the electrical signal for example, because the capacitance value between the two conductors reduces as the distance therebetween increases, it may be presumed that an inductive capacitance value corresponded to the electrode spacing 1601 will decrease with the deformation of the stretchable sensing device 1600, and an inductive capacitance value corresponded to the electrode spacing 1602 will increase with the deformation of the stretchable sensing device 1600. After integrating the corresponding position information with the variation relationship according to the aforementioned inductive capacitance values, the controller C of the stretchable sensing device 10 may determine the deformation of the stretchable sensing device 1600 so as to obtain the deformation state of the overall stretchable sensing device 1600.

In other words, referring to FIG. 1A, FIG. 1B, FIG. 15 and FIG. 16 at the same time, if the inductive capacitance value between the first sensing electrode 132N and the first sensing electrode 132S increases while the inductive capacitance value between the first sensing electrode 132W and the first sensing electrode 132E decreases, it may be determined by the controller C of the stretchable sensing device 10 that the stretchable sensing device 10 is subjected to an compression force in the Y-direction, thereby forming the compression deformation state of the stretchable sensing device 1500 as shown in FIG. 15. If the inductive capacitance value between the first sensing electrode 132N and the first sensing electrode 132S decreases while the inductive capacitance value between the first sensing electrode 132W and the first sensing electrode 132E increases, it may be determined by the controller C of the stretchable sensing device 10 that the stretchable sensing device 10 is subjected to an compression force in the X-direction, thereby forming the compression deformation state of the stretchable sensing device 1600 as shown in FIG. 16.

Based on the similar determination approach, if the inductive capacitance value between the first sensing electrode 132N and the first sensing electrode 132W and the inductive capacitance value between the first sensing electrode 132S and the first sensing electrode 132E increase while the inductive capacitance value between the first sensing electrode 132N and the first sensing electrode 132E and the inductive capacitance value between the first sensing electrode 132W and the first sensing electrode 132S decrease, it may be determined by the controller C of the stretchable sensing device 10 that the stretchable sensing device 10 is subjected to the compression force in the +X+Y to −X−Y-direction (namely, from the top-right to the bottom-left direction of the figure). If the inductive capacitance value between the first sensing electrode 132N and the first sensing electrode 132W and the inductive capacitance value between the first sensing electrode 132S and the first sensing electrode 132E decrease while the inductive capacitance value between the first sensing electrode 132N and the first sensing electrode 132E and the inductive capacitance value between the first sensing electrode 132W and the first sensing electrodes 132S increase, it may be determined by the controller C of the stretchable sensing device 10 that the stretchable sensing device 10 is subjected to the compression force in the +X−Y to −X+Y-direction (namely, from the top-left to the bottom-right direction).

Based on the similar determination approach, the sensing method may also determine the deformation of or the size of the corresponding force applied on the stretchable sensing device 10 through an inductive capacitance value difference or an inductive capacitance value ratio of the stretchable sensing device 10 at before the deformation and after the deformation.

In the stretchable sensing device of one embodiment of the present disclosure, the stretchable material layer may be used to connect the distribution regions defined by the slits, and the stretchable sensing device may be deformed with the use, thereby increasing the applicability of the stretchable sensing device. In the sensing method of the stretchable sensing device of one embodiment of the present disclosure, the stretchable material layer connecting the separated distribution regions is formed, the stretchable material layer has the property of plastic deformation, and the stretchable sensing device may sense the deformation state of the stretchable sensing device with the sensing electrodes on the substrate.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A sensing method of a sensing device, wherein the sensing device comprises a stretchable sensing device, wherein the stretchable sensing device comprises a first substrate, a first sensing element layer and a stretchable material layer, the first substrate has a plurality of first slits, each of the first slits penetrates through the first substrate from top to bottom to divide the first substrate into a plurality of first distribution regions, the first sensing element layer comprises a plurality of first sensing electrodes, the first sensing electrodes are located within the first distribution regions, a first horizontal spacing between at least two of the first sensing electrodes respectively located within two adjacent first distribution regions is greater than a second horizontal spacing of the two adjacent first distribution regions, the first horizontal spacing is in the same plane as the first sensing electrodes, the second horizontal spacing is in the same plane as the first distribution regions, the first horizontal spacing is on top of and overlapping the second horizontal spacing, the stretchable material layer fills the first slits between each adjacent two of the first distribution regions to cause the first horizontal spacing and the second horizontal spacing changeable, and the first sensing electrodes are meanderingly distributed along outer edges of each of the first slits, wherein the sensing method comprises:

reading an electrical signal from one of the first sensing electrodes to obtain a first signal value corresponding to the one of the first sensing electrodes; and determining a deformation state of the stretchable sensing device from a variation of the first signal value.

2. The sensing method of the sensing device as recited in claim 1, wherein performing the electrical signal sensing to the first sensing electrodes comprises respectively performing a resistance sensing to the first sensing electrodes.

3. The sensing method of the sensing device as recited in claim 1, wherein performing the electrical signal sensing to the first sensing electrodes comprises respectively performing a capacitance sensing to the first sensing electrodes.

4. The sensing method of the sensing device as recited in claim 3, further comprising the following steps:

performing multiple times of an inductive capacitance sensing to at least one pair of the first sensing electrodes among the first sensing electrodes so as to obtain the first signal values; and calculating variances of the first signal values so as to determine the deformation state corresponded to the stretchable sensing device.

5. The sensing method of the sensing device as recited in claim 3, wherein the sensing device further comprises a second substrate and a second sensing element layer disposed on the second substrate, and the stretchable material layer is located between the first sensing electrodes and the second sensing element layer, wherein the sensing method further comprises:

performing an electrical signal sensing to the second sensing element layer so as to obtain a second signal value corresponded to the second sensing element layer.

6. The sensing method of the sensing device as recited in claim 5, wherein the second sensing element layer comprises a plurality of second sensing electrodes, and the sensing method further comprises:

performing an inductive capacitance sensing to at least one pair of the second sensing electrodes among the second sensing electrodes so as to obtain the second signal value; and calculating a variance between the first signal value and the second signal value to determine an amount of deformation corresponded to the stretchable sensing device.

7. The sensing method of the sensing device as recited in claim 5, wherein the second sensing element layer comprises a plurality of second sensing electrodes, and the sensing method further comprises:

enabling at least one of the first sensing electrodes to perform an inductive capacitance sensing with one of the second sensing electrodes so as to obtain a third signal value; and calculating a variance of the first signal value, a variance of the second signal value, and a variance of the third signal value so as to determine an amount of deformation corresponded to the stretchable sensing device.

8. The sensing method of the sensing device as recited in claim 5, wherein the sensing device further comprises a first insulating layer, the second sensing element layer comprises a plurality of second sensing electrodes, and the first insulating layer is located between one of the first sensing electrodes and one of the second sensing electrodes, wherein the sensing method further comprises:

using a signal value obtained by performing an inductive capacitance sensing to the one of the second sensing electrodes and the one of the first sensing electrodes at two sides of the first insulating layer as a correction signal value.

9. The sensing method of the sensing device as recited in claim 3, wherein the sensing device further comprises a second substrate and a second sensing element layer disposed on the second substrate, and the stretchable material layer is located between the first sensing electrodes and the second sensing element layer, wherein the sensing method further comprises:

enabling at least one of the first sensing electrodes to perform an inductive capacitance sensing with the second sensing element layer so as to obtain a third signal value; and calculating variances between the first signal values and the third signal value so as to determine an amount of deformation corresponded to the stretchable sensing device.

10. The sensing method of the sensing device as recited in claim 1, wherein the sensing device further comprises a controller, wherein the controller determines the deformation state of the stretchable sensing device with the variation of each of the first signal values.

11. A stretchable sensing device, comprising:

at least one first unit structure, comprising:

a first substrate, wherein the first substrate has a plurality of first slits and each of the first slits penetrating through the first substrate from top to bottom divides the first substrate into a plurality of first distribution regions; and a first sensing element layer, comprising a plurality of first sensing electrodes being electrically isolated to each other, and the first sensing electrodes being located within the first distribution regions, wherein a first horizontal spacing between at least two of the first sensing electrodes respectively located within two adjacent first distribution regions is greater than a second horizontal spacing of the two adjacent first distribution regions, the first horizontal spacing is on the same plane as the first sensing electrodes, the second horizontal spacing is on the same plane as the first distribution regions, the first horizontal spacing is on top of and overlapping the second horizontal spacing;

at least one second unit structure, comprising: a second substrate; and a second sensing element layer, located on the second substrate; and a stretchable material layer, located between the first unit structure and the second unit structure, and filling the first slits between each adjacent two of the first distribution regions to a cause the first horizontal spacing and the second horizontal spacing changeable;

a controller, wherein the controller determines an amount of deformation corresponded to the stretchable sensing device with a first signal value corresponded to each of the first sensing electrodes.

12. The stretchable sensing device as recited in claim 11, wherein the stretchable material layer is formed in the first slits of the first substrate, the first slits are distributed along ring-like paths that are arranged sequentially from an inside towards an outside around a first unit center, and each of the first sensing electrodes meanders in conformity with at least one of the first slits.

13. The stretchable sensing device as recited in claim 11, wherein the second substrate has a plurality of second slits that defines a plurality of second distribution regions.

14. The stretchable sensing device as recited in claim 13, wherein at least one of the first distribution regions has an orthographic projection on the second substrate overlapping the second distribution regions on the second substrate.

15. The stretchable sensing device as recited in claim 13, wherein the second sensing element layer comprises a plurality of second sensing electrodes being electrically isolated to each other, and the second sensing electrodes are located on the second distribution regions.

16. The stretchable sensing device as recited in claim 13, wherein the stretchable material layer is formed in the second slits of the second substrate.

17. The stretchable sensing device as recited in claim 11, wherein the first sensing element layer is located between the first substrate and the second substrate, and the second substrate is located between the first sensing element layer and the second sensing element layer; or the second sensing element layer is located between the first substrate and the second substrate, and the first substrate is located between the first sensing element layer and the second sensing element layer.

18. The stretchable sensing device as recited in claim 11, further comprising a first insulating layer located between at least one of the first distribution regions and the second sensing element layer, wherein a Young's modulus of the first insulating layer is greater than that of the stretchable material layer.

19. The stretchable sensing device as recited in claim 18, further comprising a second insulating layer located between at least one of the first distribution regions and the second sensing element layer, and the second insulating layer being disposed at a periphery of the first insulating layer, wherein a Young's modulus of the second insulating layer is greater than the Young's modulus of the first insulating layer.

* * * * *